(12) United States Patent
Woods et al.

(10) Patent No.: US 9,051,669 B2
(45) Date of Patent: Jun. 9, 2015

(54) MULTILAYER PADS AND METHODS OF MANUFACTURE EMPLOYING THERMAL BONDING

(76) Inventors: James M. Woods, Hendersonville, NC (US); Marilyn S. Woods, Hendersonville, NC (US)

( * ) Notice: Subject to any disclaimer, the term of this patent is extended or adjusted under 35 U.S.C. 154(b) by 202 days.

(21) Appl. No.: 13/188,855

(22) Filed: Jul. 22, 2011

(65) Prior Publication Data

US 2012/0021187 A1    Jan. 26, 2012

Related U.S. Application Data

(60) Provisional application No. 61/366,984, filed on Jul. 23, 2010.

(51) Int. Cl.
| | |
|---|---|
| *D04H 1/593* | (2012.01) |
| *A47K 7/02* | (2006.01) |
| *B32B 3/08* | (2006.01) |
| *B32B 5/02* | (2006.01) |
| *B32B 5/08* | (2006.01) |
| *B32B 27/12* | (2006.01) |
| *B32B 27/32* | (2006.01) |

(52) U.S. Cl.
CPC ........... *D04H 1/593* (2013.01); *Y10T 156/1052* (2015.01); *Y10T 156/1051* (2015.01); *Y10T 428/24752* (2015.01); *A47K 7/02* (2013.01); *B32B 3/08* (2013.01); *B32B 5/022* (2013.01); *B32B 5/08* (2013.01); *B32B 27/12* (2013.01); *B32B 27/32* (2013.01); *B32B 2250/02* (2013.01); *B32B 2262/0253* (2013.01); *B32B 2262/0276* (2013.01); *B32B 2262/062* (2013.01); *B32B 2307/726* (2013.01); *B32B 2307/7265* (2013.01)

(58) Field of Classification Search
USPC .............................................. 15/209.1, 244.1
See application file for complete search history.

(56) References Cited

U.S. PATENT DOCUMENTS

| | | | | |
|---|---|---|---|---|
| 5,230,119 | A | * | 7/1993 | Woods et al. ................. 15/209.1 |
| 5,507,906 | A | | 4/1996 | Woods et al. |
| 5,771,524 | A | * | 6/1998 | Woods et al. ................. 15/209.1 |
| RE36,601 | E | | 3/2000 | Woods et al. |
| 6,044,515 | A | | 4/2000 | Zygmont |
| 6,493,898 | B1 | * | 12/2002 | Woods et al. ................. 15/209.1 |

OTHER PUBLICATIONS

Internet web page—http://www.dukane.com/us/PPL_upa.htm#DPC Series Ultrasonic welders; author unknown.
Internet web page—http://www.herrmannultrasonics.com/nonwovens.html; author unknown.

(Continued)

*Primary Examiner* — Monica Carter
*Assistant Examiner* — Stephanie Berry
(74) *Attorney, Agent, or Firm* — Luedeka Neely Group, P.C.

(57) ABSTRACT

In-line methods for manufacturing a plurality of multilayer pads and the resultant pads. Various embodiments of the invention employ one or two thermal bonding stations, such as ultrasonic bonding stations, along with handle folding tooling, to produce two- or three-layer pads in various configurations, without the use of adhesive. Following bonding and handle folding, a cutter, such as a die cutter, is employed to cut through the layers to form individual pads. Pads of various configurations are manufactured, including pads with "L"-shaped handles, handles of "wing" configuration, and "folded" handles.

12 Claims, 14 Drawing Sheets

(56) References Cited

OTHER PUBLICATIONS

Internet web page—http://www.twi.co.uk/content/pjkultrason.html; author unknown.
Internet web page—http://www.plastemart.com/PrintFile.asp?REF=/webtech/upload/Literature/Frequency in ultrasonic plastic welding machines applications limitations.asp&LiteratureID=1292; author unknown.
Author unknown, "Continuous Lamination, Embossing, Slitting and Cutting of Roll Goods Nonwovens," date unknown, published by Hermann Ultrasonics, Inc. of Bartlett, IL.

* cited by examiner

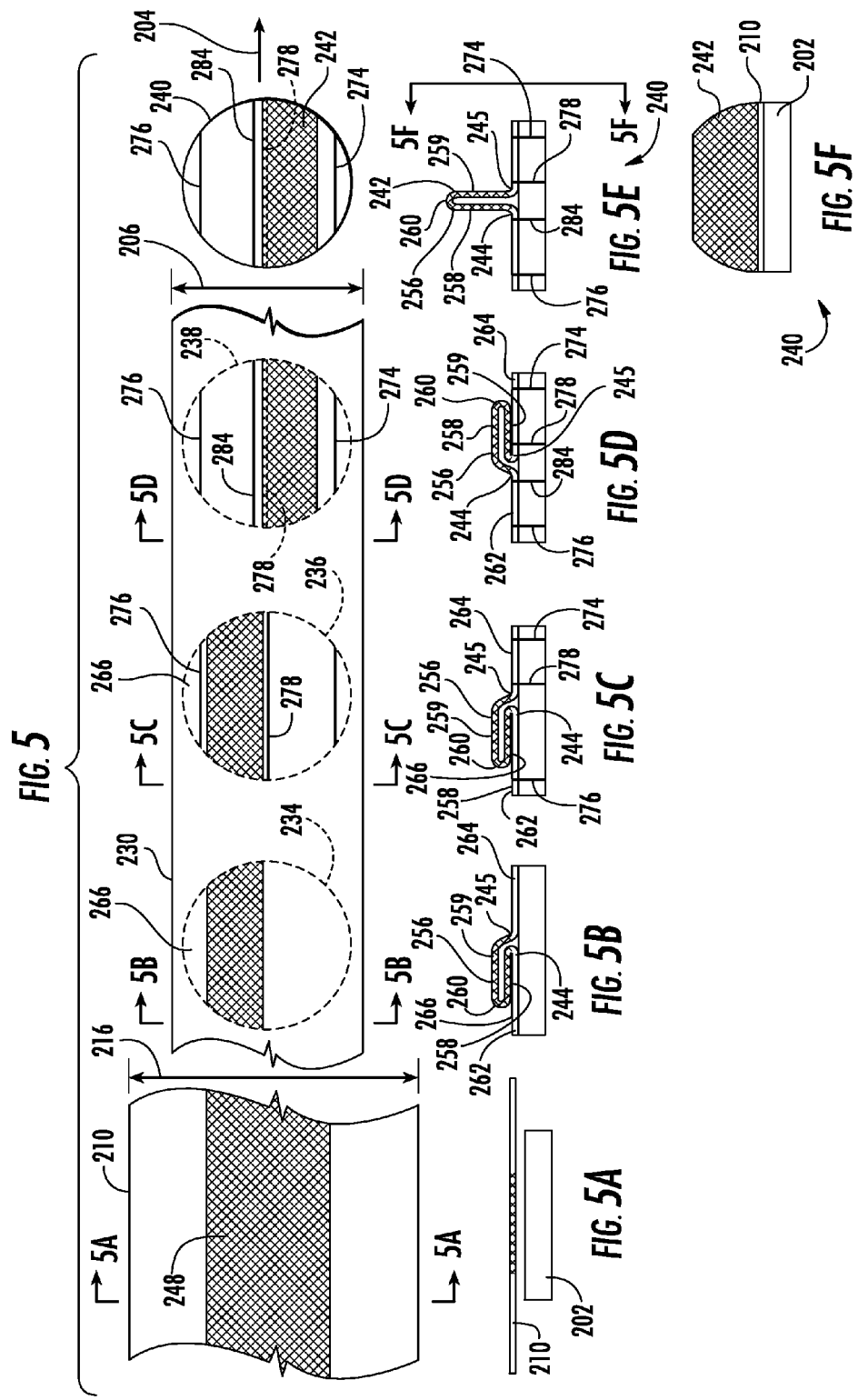

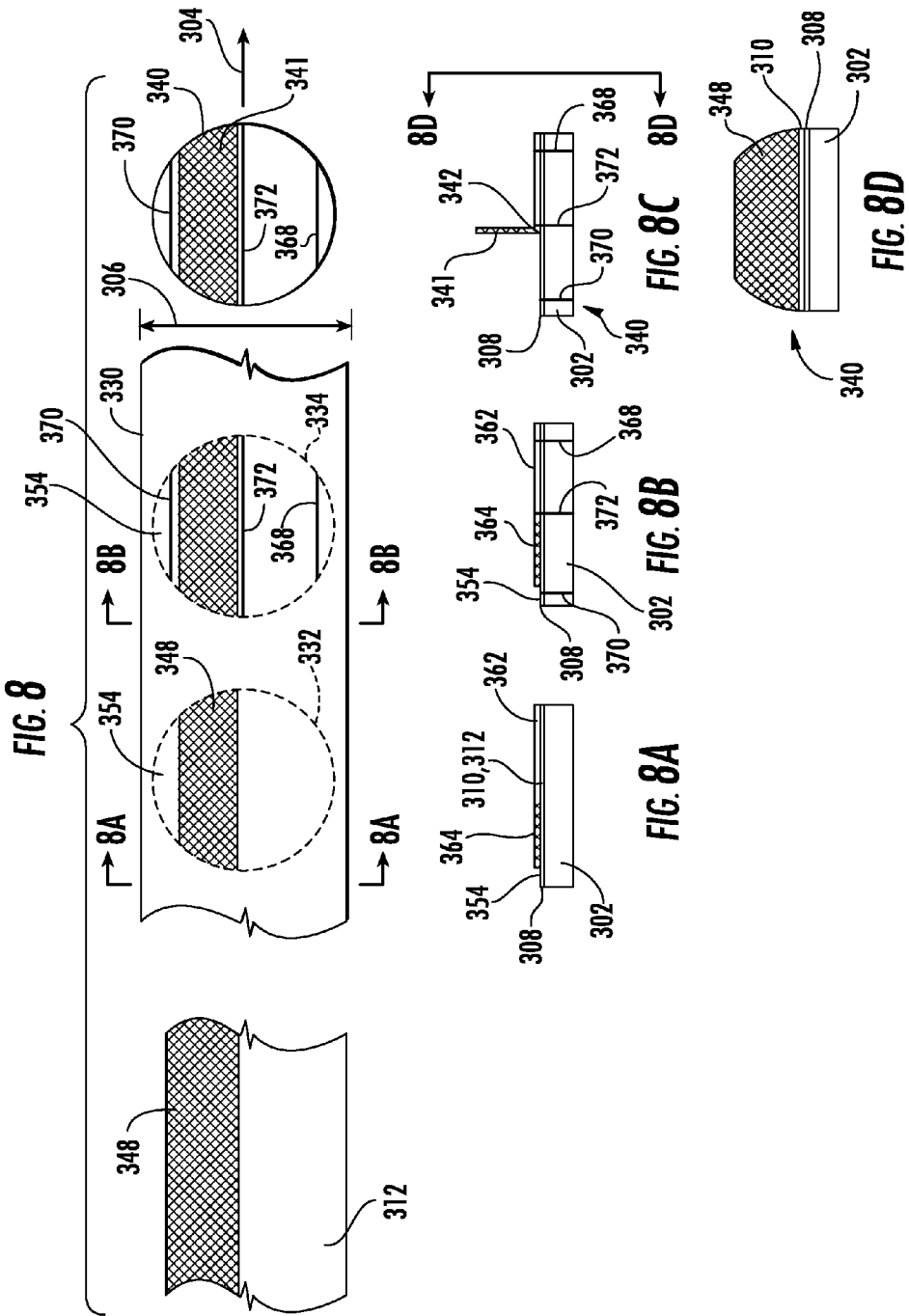

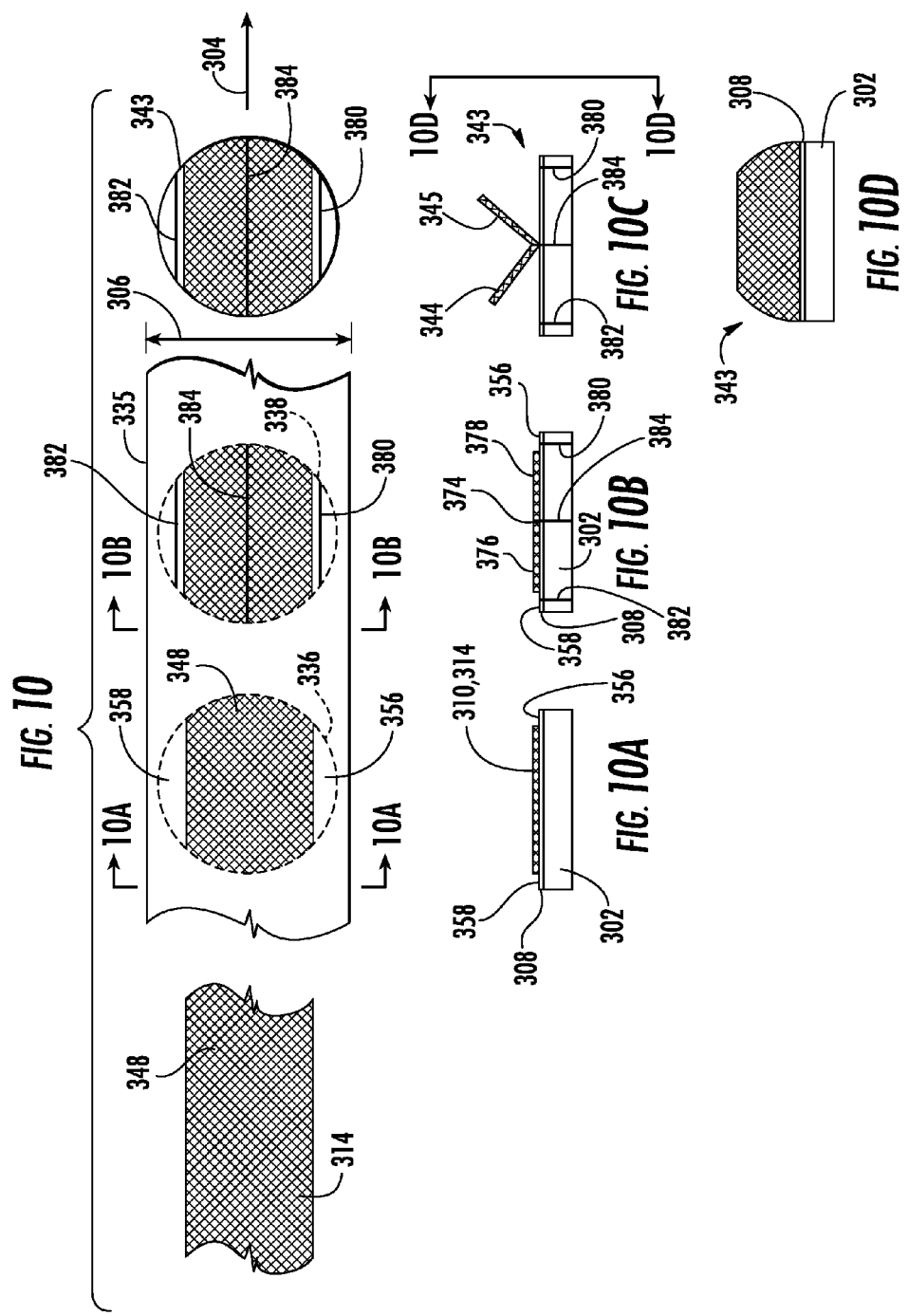

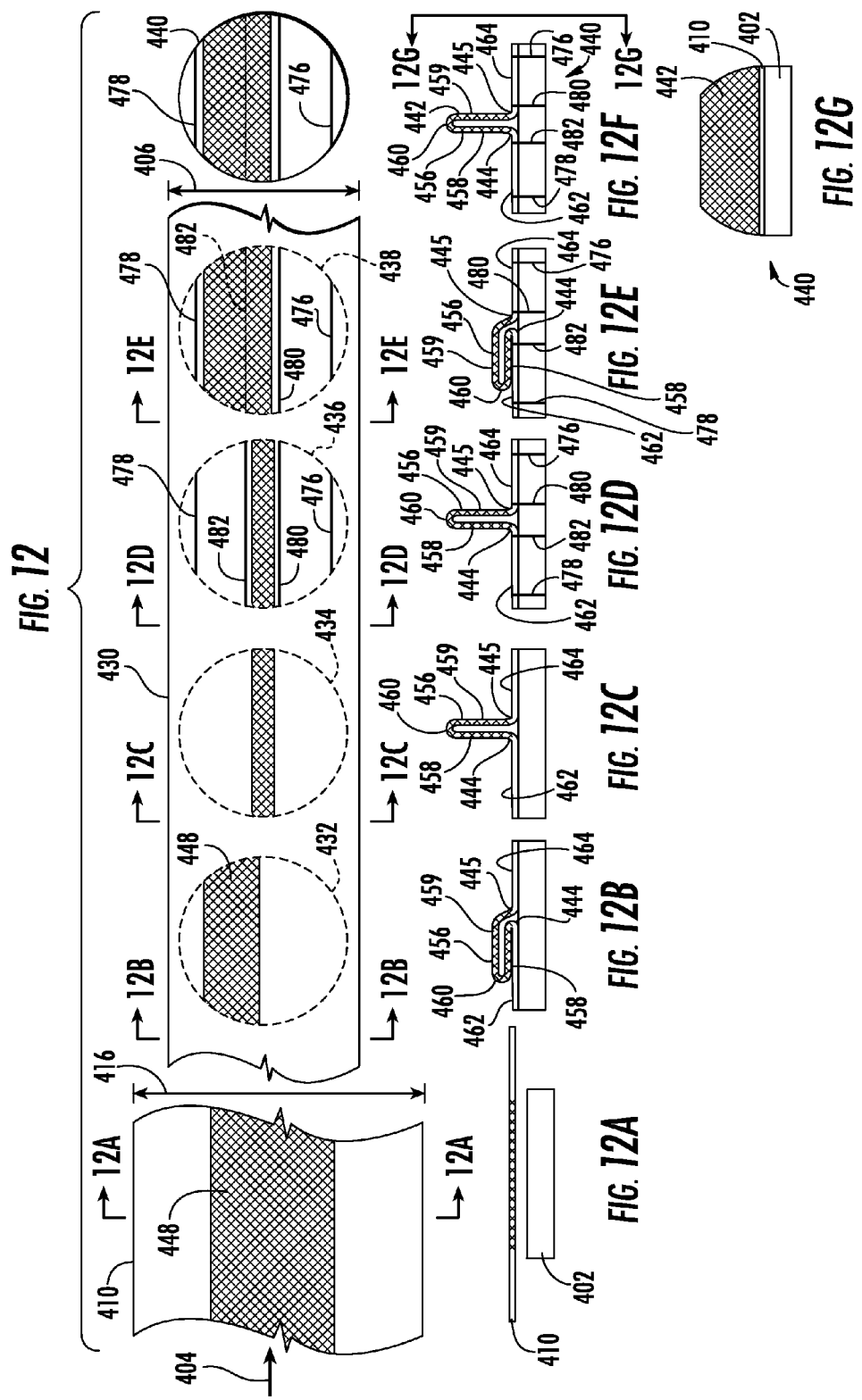

MULTILAYER PADS AND METHODS OF MANUFACTURE EMPLOYING THERMAL BONDING

CROSS-REFERENCE TO RELATED APPLICATION

The benefit of U.S. provisional patent application Ser. No. 61/366,984, filed Jul. 23, 2010, is claimed.

BACKGROUND OF THE INVENTION

The invention relates generally to multilayer pads and methods of manufacture such as are disclosed in our earlier Woods et al U.S. Pat. No. 5,230,119, titled "Multilayer Laminated Pad;" U.S. Pat. No. 5,507,906 (now U.S. Re. 36,601), titled "Method for Making Multilayer Pad;" U.S. Pat. No. 5,771,524, titled "Disposable Pad;" and U.S. Pat. No. 6,493,898, titled "Laminated pads and methods of manufacture employing mechanically folded handles," the entire disclosures of which are hereby expressly incorporated by reference; as well as Zygmont U.S. Pat. No. 6,044,515, the entire disclosure of which is hereby expressly incorporated by reference.

The pads disclosed in our earlier patents generally are manufactured by initially forming a two- or three-layer composite laminated sheet using adhesive or other attachment to combine base pad forming material, impervious barrier layer forming material, and handle forming material. The base pad forming material, barrier layer forming material and handle forming material are provided as respective webs of material from supply rolls, the webs each having a predetermined width (typically the same width for all three webs in the pads disclosed in U.S. Pat. No. 5,230,119; U.S. Pat. No. 5,507,906; U.S. Re. 36,601 and U.S. Pat. No. 5,771,524), with lengths depending on the roll size. U.S. Pat. No. 5,230,119; U.S. Pat. No. 5,507,906 and U.S. Re. 36,601 generally disclose pads which have what may be referred to as "L"-shaped handles. U.S. Pat. No. 5,771,524 generally discloses pads which have handles that may be referred to as "wings". U.S. Pat. No. 6,493,898 generally discloses pads which have what may be referred to as "folded" handles.

In the pads disclosed in U.S. Pat. No. 5,230,119; U.S. Pat. No. 5,507,906 and U.S. Re. 36,601 ("L"-shaped handles), and U.S. Pat. No. 5,771,524 ("wings"), the exemplary adhesive attaching the web of base pad forming material and the web of barrier layer forming material to each other is applied as a full coating, such that these two web layers are continuously adhered to each other along their entire widths. However, the adhesive which joins the web of barrier layer forming material to the web of handle forming material is applied in longitudinal strips, which may be referred to as "zone coating." A cutter is then used to cut through all three layers of the laminated sheets to produce individual multilayer pads. The cutter is aligned with reference to the adhesive strips securing the handle forming material to the barrier forming material, as well as with reference to uncoated areas between the adhesive strips, such that, in each of the resulting pads, a portion of the handle forming material layer is over an adhesive strip resulting in an adhered segment of the handle, and another portion (or portions) of the handle forming material layer within the shape of the cutter is over an uncoated area resulting in a free or graspable portion of the handle. The resultant graspable handle portion lies flat against the barrier layer prior to initial use, and pivots up for use.

U.S. Pat. No. 6,493,898 ("folded" handles) discloses the manufacture of similar pads, while avoiding the need for zone coating to define adhered handle segments. Rather, the handle forming material is mechanically folded, employing a pleating/folding machine, prior to being adhered to the barrier layer. As alternatives, adhesive is applied to the barrier layer, or to the underside of the handle forming material subsequent to folding, or to the underside of the handle forming material prior to folding.

Although several prior art patents, for example Woods et al U.S. Pat. No. 5,771,524, include general suggestions that layers may be fused employing an ultrasonic bonding process without the use of adhesive, as a practical matter specific processes and resultant pads are not disclosed. Rather, a characteristic of actual commercial embodiments (for example pads with "L"-shaped handles as disclosed in U.S. Pat. No. 5,230,119) is that the various layers are joined employing adhesives.

SUMMARY OF THE INVENTION

In one aspect, an in-line method for manufacturing a plurality of multilayer pads is provided. The method includes the steps of providing a web of fusible base pad forming material having a longitudinal axis and a width; providing a web of fusible intermediate barrier layer forming material having a longitudinal axis and a width; providing a web of fusible handle forming material having a longitudinal axis; conveying the webs into adjacency; at a first bonding station, fusing a portion of the handle forming material to the barrier layer forming material leaving a free portion of the handle forming material, and correspondingly fusing the barrier layer forming material to the base pad forming material; folding over the free portion of the handle forming material to uncover a portion of the barrier layer forming material previously covered by the free portion; at a second bonding station, fusing the uncovered portion of the barrier layer forming material to the base pad forming material; and cutting through the layers of handle forming material, intermediate layer forming material and base pad forming material to create a multilayer pad.

In another aspect, an in-line method for manufacturing a plurality of multilayer pads is provided. The method includes the steps of providing a web of fusible base pad forming material having a longitudinal axis and a width; providing a web of fusible handle forming material having a longitudinal axis; conveying the webs into adjacency and forming the web of handle forming material into a longitudinally extending pleat including two facing segments of handle forming material and a folded edge defining a handle graspable portion precursor, the height of the pleat being less than one-half of the width of a pad being manufactured, and into a pair of longitudinally extending handle attached portion precursors joined to the pleat along fold lines and extending over the base pad forming material; folding the pleat down to one side generally over one of the handle attached portion precursors while leaving a portion of the one handle attached portion precursor exposed near a pad precursor lateral edge, with the other handle attached portion precursor fully exposed; at a first bonding station, fusing the other handle attached portion precursor to the base pad forming material at least immediately adjacent one of the fold lines, and fusing the exposed portion of the one handle attached portion to the base pad forming material; folding the pleat over to the other side to fully expose the one handle attached portion precursor; at a second bonding station, fusing the one handle portion precursor to the base pad forming material at least immediately adjacent to the other of the fold lines; and cutting through the layers of handle forming material and base pad forming material to create a multilayer pad.

In yet another aspect, an in-line method for manufacturing a plurality of multilayer pads is provided. The method includes the steps of providing either a web of fusible base pad forming material and a web of fusible intermediate barrier layer forming material having longitudinal axes and widths, or a single web of fusible co-extruded barrier-to-base layer material having a longitudinal axis and a width; providing a web of fusible handle forming material having a width less than the width of a pad being manufactured; conveying the webs into adjacency, with at least one side edge portion of the intermediate barrier layer or of the co-extruded material layer exposed near a pad precursor lateral edge; at a bonding station, fusing a portion of the handle forming material to the intermediate barrier layer or to the co-extruded material layer while leaving at least one other portion of the handle forming material free to define a graspable portion precursor, and, in the event separate webs of base pad forming material and intermediate barrier layer forming material were provided, fusing the barrier layer forming material to the base pad forming material; and cutting through the layers of material to create a multilayer pad.

In yet another aspect, an in-line method for manufacturing a plurality of multilayer pads is provided. The method includes the steps of providing a web of fusible base pad forming material having a longitudinal axis and a width; providing a web of fusible handle forming material having a longitudinal axis; conveying the webs into adjacency and forming the web of handle forming material into a longitudinally extending pleat including two facing segments of handle forming material and a folded edge defining a handle graspable portion precursor, the height of the pleat being less than one half of the width of a pad being manufactured, and into a pair of longitudinally extending handle attached portion precursors joined to the pleat along fold lines and extending over the base pad forming material; standing the pleat upright perpendicularly to the handle attached portion precursors and to the base pad forming material; at a bonding station, fusing the handle attached portion precursors to the base pad forming material at least immediately adjacent the fold lines; and cutting through the layers of handle forming material and base pad forming material to create a multilayer pad.

In still another aspect, a multilayer pad is provided. The multilayer pad includes an absorbent base pad layer having an applying/wiping surface, an attachment surface opposite the applying/wiping surface, and an outer periphery; a barrier layer having a lower surface attached by fusing to the base pad layer attachment surface, an upper surface and an outer periphery coextensive with the outer periphery of the base pad layer; and a handle including an attached portion fused to a portion of the barrier layer upper surface, and including at least one graspable free portion joined to the handle attached portion along a fold line.

BRIEF DESCRIPTION OF THE DRAWINGS

FIGS. 3A, 3B, 3C and 3D are views taken on lines 3A-3A, 3B-3B, 3C-3C and 3D-3D of FIG. 3, representing pad precursors in end elevational view at various stages of manufacture prior to individual pads being cut out of a moving web;

FIG. 3E is an end elevational view of an individual pad in its in-use configuration, generally corresponding to the right-most pad in the sequence of FIG. 3, except with the pad handle pivoted up;

FIG. 3F is a side elevational view of the pad of FIG. 3E, taken on line 3F-3F of FIG. 3E;

FIG. 5 is a highly schematic representation of in-line steps to manufacture pads with "folded" handles employing the machine of FIG. 4, illustrating pads in top plan view at various stages of manufacture, with dash lines representing future cut lines and representing pad precursors;

FIGS. 5A, 5B, 5C and 5D are views taken on lines 5A-5A, 5B-5B, 5C-5C and 5D-5D of FIG. 5, representing pad precursors in end elevational view at various stages of manufacture prior to individual pads being cut out of a moving web;

FIG. 5E is an end elevational view of an individual pad in its in-use configuration, generally corresponding to the right-most pad in the sequence of FIG. 5, except with the pad handle pivoted up;

FIG. 5F is a side elevational view of the pad of FIG. 5E, taken on line 5F-5F of FIG. 5E;

FIG. 8 is a highly schematic representation of in-line steps to manufacture pads with "L"-shaped handles employing the machine of FIG. 7, illustrating pads in top plan view at various stages of manufacture, with dash lines representing future cut lines and representing pad precursors;

FIGS. 8A and 8B are views taken on lines 8A-8A and 8B-8B of FIG. 8, representing pad precursors in end elevational view at two stages of manufacture prior to individual pads being cut out of a moving web;

FIG. 8C is an end elevational view of an individual pad in its in-use configuration, generally corresponding to the right-most pad in the sequence of FIG. 8, except with the pad handle pivoted up;

FIG. 8D is a side elevational view of the pad of FIG. 8C, taken on line 8D-8D of FIG. 8C;

FIG. 10 is a highly schematic representation of in-line steps to manufacture pads with "wing" handles employing the machine of FIG. 7, illustrating pads in top plan view at various stages of manufacture, with dash lines representing future cut lines and representing pad precursors;

FIGS. 10A and 10B are views taken on lines 10A-10A and 10B-10B of FIG. 10, representing pad precursors in end elevational view at two stages of manufacture prior to individual pads being cut out of a moving web;

FIG. 10C is an end elevational view of an individual pad in its in-use configuration, generally corresponding to the rightmost pad in the sequence of FIG. 10, except with the wings of the pad handle pivoted up;

FIG. 10D is a side elevational view of the pad of FIG. 10C, taken on line 10D-10D of FIG. 10C;

FIG. 12 is a highly schematic representation of in-line steps to manufacture pads with "folded" handles employing the machine of FIG. 12, illustrating pads in top plan view at various stages of manufacture, with dash lines representing future cut lines and representing pad precursors;

FIGS. 12A, 12B, 12C, 12D and 12E are views taken on lines 12A-12A, 12B-12B, 12C-12C, 12D-12D and 12E-12E of FIG. 12, representing pad precursors in end elevational view at various stages of manufacture prior to individual pads being cut out of a moving web;

FIG. 12F is an end elevational view of an individual pad in its in-use configuration, generally corresponding to the rightmost pad in the sequence of FIG. 12, except with the pad handle pivoted up;

FIG. 12G is a side elevational view of the pad of FIG. 12F, taken on line 12G-12G of FIG. 12F;

DETAILED DESCRIPTION

Figure 1:
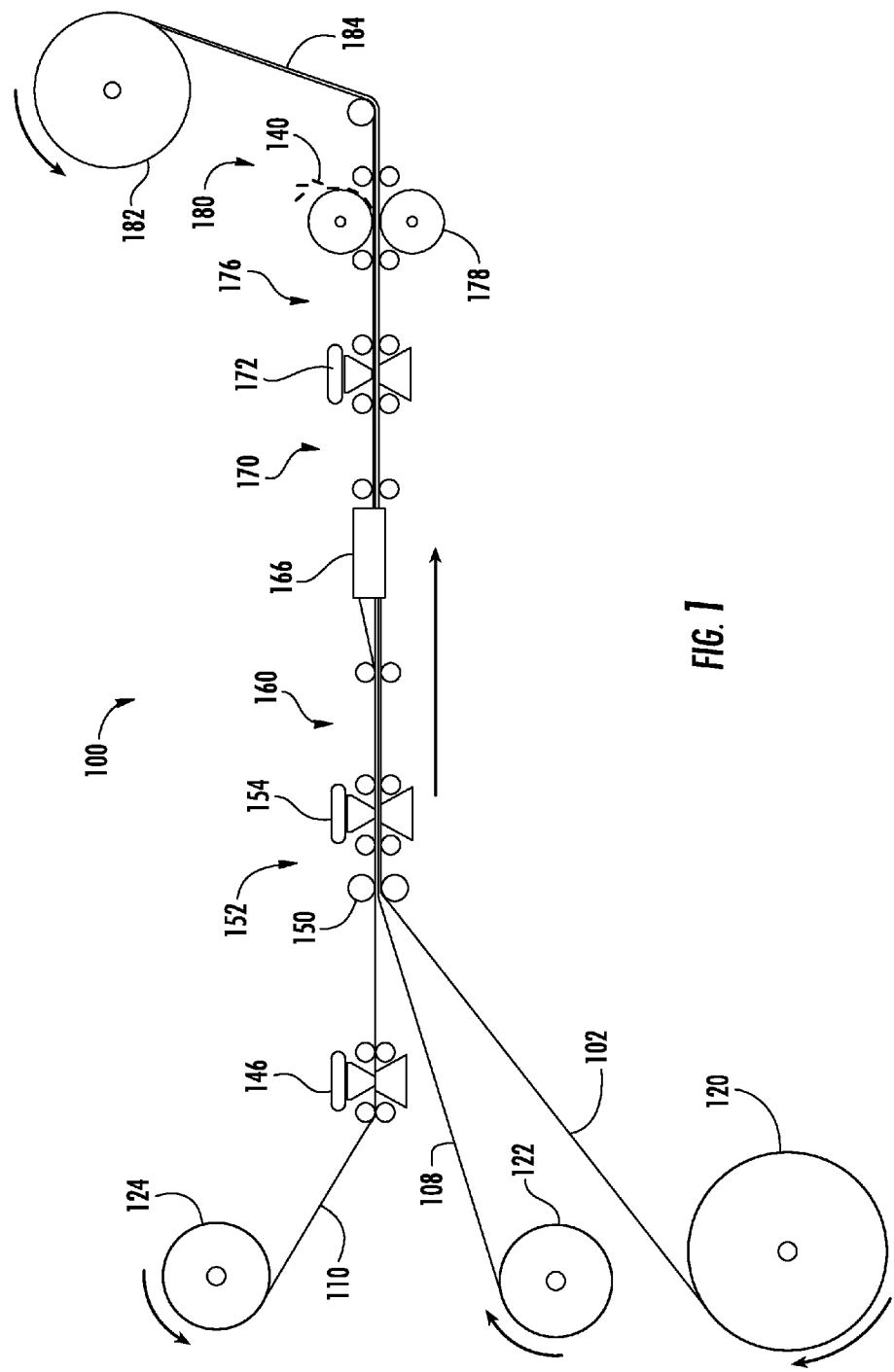
FIG. 1 is a schematic representation of a machine for the in-line automatic manufacture of three-layer pads, which have what may be referred to as "L"-shaped handles, the machine of FIG. 1 including ultrasonic bonding equipment and automatic folding tooling.

In overview, a thermal bonding, thermal fusion or heat fusion process is employed in embodiments of the invention to bond one or two layers of impervious film to a layer of non-woven base pad forming material, without the use of an adhesive of any kind. A cutter, such as a die cutter, is then employed to cut through the layers to form individual pads. An embosser may be employed to emboss film used for the handle, making the handle easier to see, as well as providing a better grip).

The presently-preferred thermal bonding, thermal fusion or heat fusion process is ultrasonic bonding (also known as ultrasonic laminating or ultrasonic welding). Accordingly, the embodiments of the invention described hereinbelow employ ultrasonic bonding or welding, by way of example and not limitation. When ultrasonic welding or bonding is employed, vibratory energy is converted to heat, which softens and may even melt the materials. Other potential sources of heat for thermal bonding include hot irons, hot air or other gas, a source of infrared energy, or other electromagnetic energy source such as a laser, all by way of example and not limitation. Fundamentally, any technique which provides localized heat in predetermined patterns for bonding, welding or fusion may be employed.

In addition to thermal bonding, thermal processes may be employed in the die cutter, as well as in the embosser. Thus individual pads may be cut out using, as examples, ultrasonic tooling or a laser. Thermal or heat-producing equipment may be employed to emboss film used for the handle Ultrasonic bonding or welding (also known as ultrasonic laminating or ultrasonic welding) is a joining technique that uses high-frequency ultrasonic acoustic vibrations to effect solid state welding of materials that have either the same or different melting point temperatures. An ultrasonic solid-state bond is as strong as the bonded materials themselves.

Suitable ultrasonic bonding or welding equipment (i.e., ultrasonic tooling) is available, as an example, from Dukane Corporation, 2900 Dukane Drive, St. Charles, Ill. 60174 (http://www.dukane.com/us/). Another source is Herrmann Ultrasonics Inc., 1261 Hardt Circle, Bartlett, Ill. 60103 (www.herrmannultrasonics.com). Information regarding ultrasonic bonding or welding is available from TWI Ltd, Granta Park, Great Abington, Cambridge CB21 6AL, United Kingdom, and ultrasonic welding is described on their webpage http://www.twi.co.uk/content/pjkultrason.html. In addition, information regarding ultrasonic welding is available on the webpage http://www.plastemart.com/upload/Literature/Frequency-in-ultrasonic-plastic-welding-machines-applications-limitations.asp?LiteratureID=1292 or http://www.plastemart.com/PrintFile.asp?REF=/webtech/upload/Literature/Frequency-in-ultrasonic-plastic-welding-machines-applications-limitations.asp&LiteratureID=1292.

Ultrasonic equipment may be tooled for a variety of specific operations, including in-line welding, embossing, slitting and sealing, either in single modules or arranged in an array across the web.

Illustrated herein are examples of two- and three-layer multilayer pads manufactured employing ultrasonic bonding or welding, without the use of adhesives of any kind. Various standard ultrasonic tooling is readily available and may be employed in the embossing, welding and slitting of a variety of materials employed in the manufacture of multilayer pads.

Referring now to FIG. 1, a machine 100 for the in-line automatic manufacture of three-layer pads employing ultrasonic embossing, slitting and bonding equipment is illustrated in schematic representation. The machine 100 of FIG. 1 may be employed to make pads having "L"-shaped handles as generally disclosed in Woods et al U.S. Pat. No. 5,230,119 and U.S. Re. 36,601.

Figure 2:
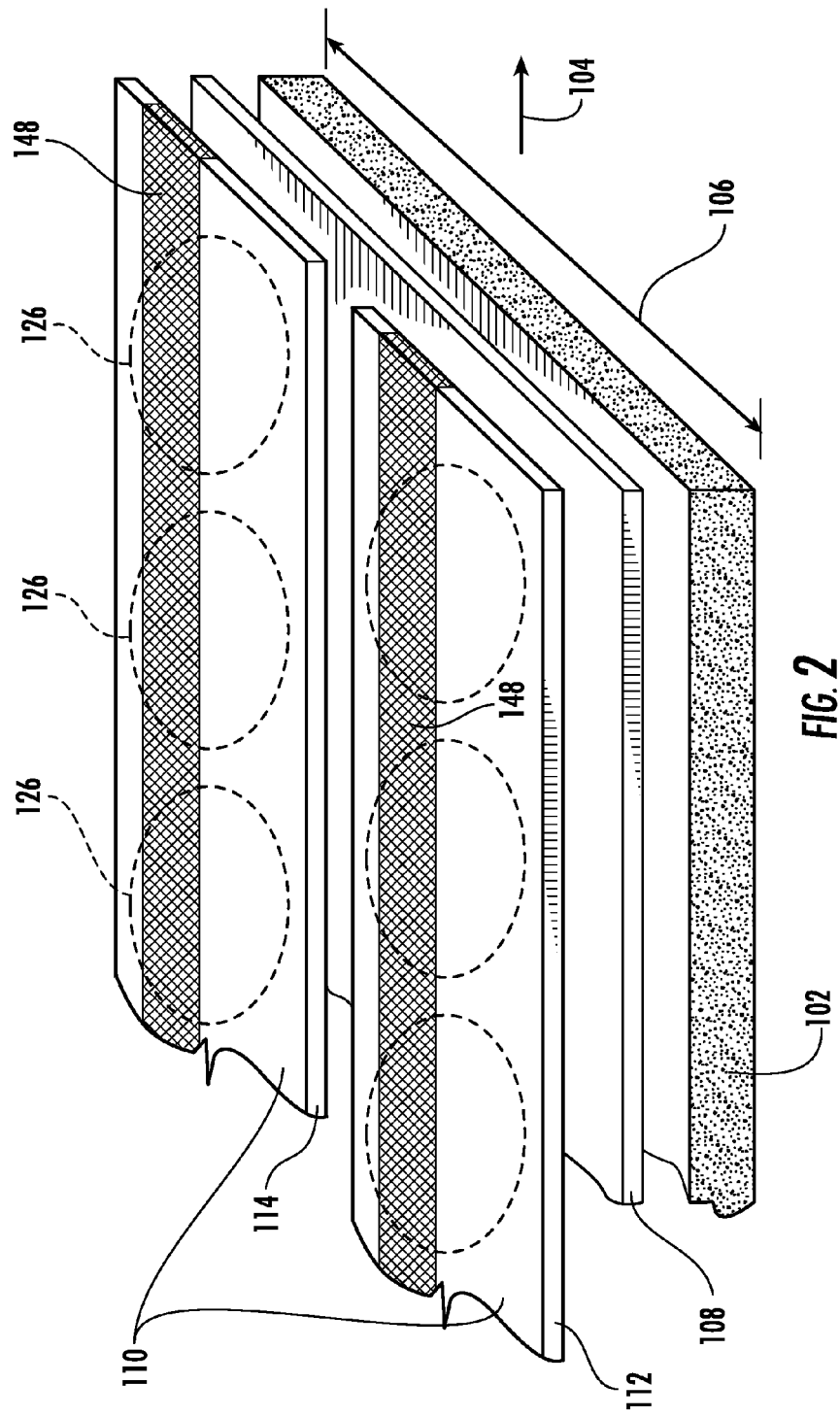
FIG. 2 is a three-dimensional view of a web of handle forming material embossed and slit into sub webs, a web of intermediate barrier layer material, and a web of base pad material adjacent to each other as processed in the machine of FIG. 1, in a condition prior to fusing.

FIG. 2 is a three-dimensional representation of three webs of material as processed in the machine 100 of FIG. 1, a web 102 of fusible base pad forming material having a longitudinal axis represented by directional arrow 104 and a width 106, a web 108 of fusible intermediate barrier layer forming material having a longitudinal axis also represented by the directional arrow 104 and the same width 106, and a web 110 of fusible handle forming material having a longitudinal axis also represented by the directional arrow 104. The web 110 is longitudinally split or slit into a plurality of narrower sub webs of handle forming material, for example two sub webs 112 and 114. For clarity of illustration in FIG. 2 there is a lateral gap between the sub webs 112 and 114 of handle forming material, which is an exaggeration; after typical slitting the sub webs 112 and 114 are closely adjacent.

Figure 3:
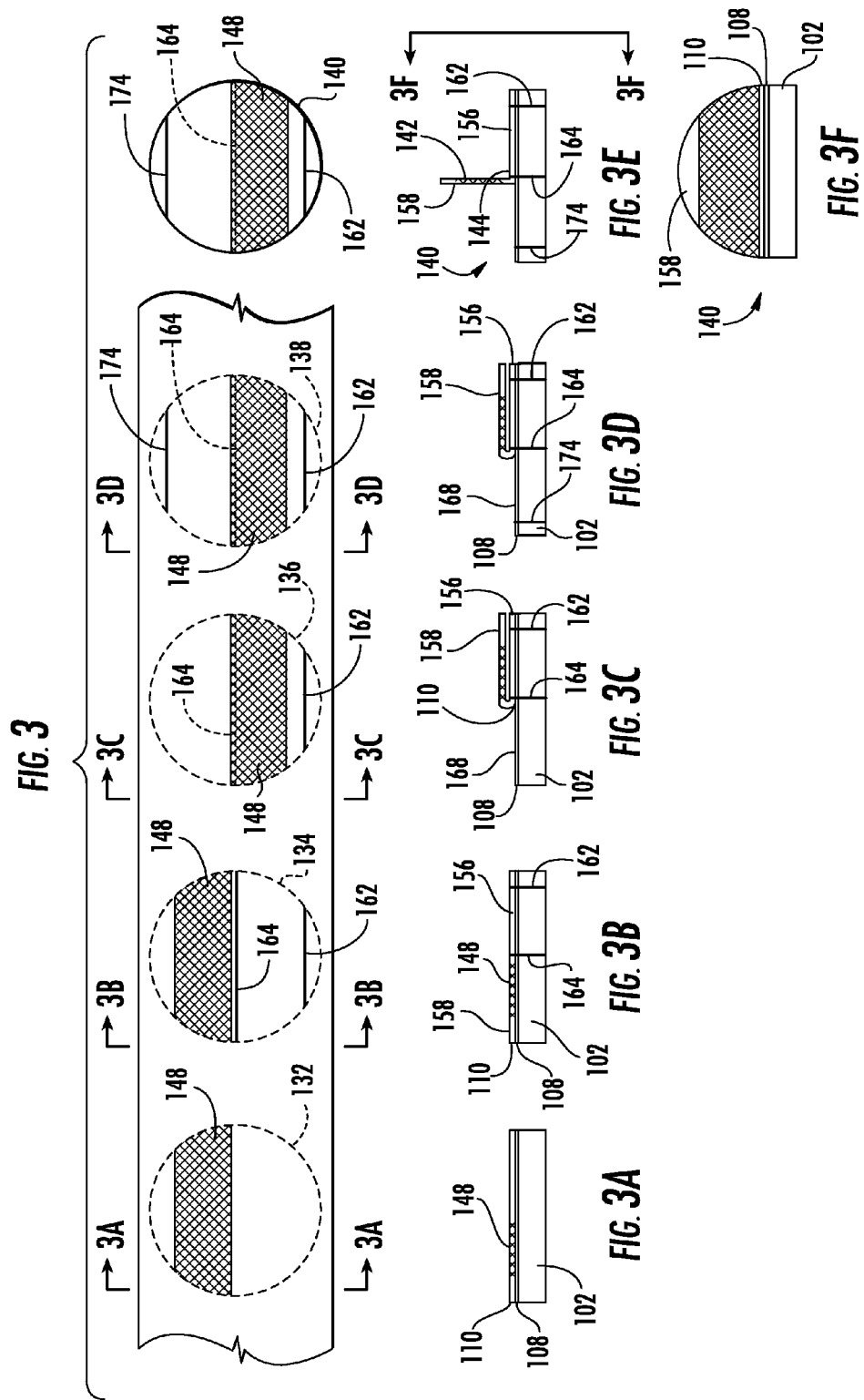
FIG. 3 is a highly schematic representation of in-line steps to manufacture pads with "L"-shaped handles employing the machine of FIG. 1, illustrating pads in top plan view at various stages of manufacture, with dash lines representing future cut lines and representing pad precursors.

FIG. 3 is a corresponding highly schematic representation of in-line steps to manufacture pads with "L"-shaped handles employing the machine of FIG. 1.

The machine 100 includes a feed roll 120 feeding or supplying the web 102 of fusible base pad forming material, a feed roll 122 supplying the web 108 of fusible intermediate barrier layer forming material having a longitudinal axis and a width, and a feed roll 124 supplying the web 110 of fusible handle forming material. To facilitate thermal fusion, the material webs 102, 108 and 110 are of thermoplastic materials, such as polypropylene. The web 102 of base pad forming material is an absorbent material, made of non-woven fibers such as polypropylene or polyester. A blend of fibers for the base pad 102 material may also be employed, for example including cotton (which by itself is non-fusible), but with a sufficient percentage of fusible fibers in the blend so that the resultant base pad material web 102 is fusible.

The machine of FIG. 1 may be employed to manufacture pads in a single line as implied by FIG. 3. However, in practical commercial embodiments pads are manufactured in-line in multiple longitudinal lines defining rows with multiple pad precursors 126 shown in dash lines extending across the width of the webs 102, 108 and 110. The rows extend perpendicularly to the longitudinal axis represented by the arrow 104. Although two rows of pad precursors 126 (and two corresponding sub webs 112 and 114 of handle forming material) are shown in FIG. 2, more rows are processed in a typical commercial embodiment. Examples are disclosed in U.S. Pat. No. Re. 36,601; U.S. Pat. No. 5,771,524 and U.S. Pat. No. 6,493,898. Accordingly, it will be appreciated that the single line of pads in FIG. 3 is to illustrate the principles of the invention.

In FIG. 3, a representative combined web 130 is shown in plan view, including all three layers, and including pad precursors or precursor regions 132, 134, 136 and 138 representing stages or steps of pad manufacture by the machine 100 of FIG. 1. It will be appreciated that the actual steps or stages represented by the pad precursors 132, 134, 136 and 138 are spaced out along the length of the FIG. 1 machine 100, and are not actually immediately adjacent as perhaps implied by the representation of FIG. 3.

FIG. 3 also shows a finished pad 140 in plan view, which has been cut out from the representative combined web 130. The pad 140 as manufactured has an embossed handle graspable portion 142 which is folded down as manufactured. FIG. 3E is an end elevational view of the pad 140 in its in-use configuration, with the handle graspable portion 142 pivoted up along a fold line 144.

Considering the manufacturing method disclosed in FIGS. 1, 2 and 3 in greater detail, in FIG. 1, embossing and slitting tooling 146 optionally embosses the handle forming material 110 providing texture to facilitate grasping the resultant pad handles, as well as slitting the initial web 110 of handle forming material into the sub webs 112 and 114 in the event a plurality of pad precursors extend across the web 130. In FIGS. 2 and 3, texture embossing 148 is represented by hatching. The embossing 148 is represented in FIG. 3 as discontinuous sections corresponding to pad precursors. However, as shown in FIG. 2 the embossing 148 is actually continuous longitudinally along the web 110 of handle forming material, or, more particularly, along the sub webs 112 and 114.

Mechanical embossing and slitting tooling may be employed at 146 or, alternatively, ultrasonic embossing and slitting tooling may be employed.

Downstream of the embossing and slitting tooling 146, the three webs 102, 108 and 110 are conveyed into adjacency, between a pair of rollers 150.

FIG. 3 pad precursor 132 and the corresponding view of FIG. 3A, represent the condition at point 152 in the machine 100 of FIG. 1. All three layers are present, but no bonding has occurred. Pads have not yet been cut out, existing as precursor regions only.

At a first bonding station 154, a portion 156 of the handle forming material 110 is fused to the barrier layer forming material 108, leaving a free portion 158 of the handle forming material. The free portion 158 includes the embossing 148, and ultimately becomes the handle graspable portion 142. Correspondingly, the barrier layer material 108 is fused to the base pad material 102. The FIG. 3 pad precursor 134 and the corresponding view of FIG. 3B represent the condition at point 160 in the machine 100 of FIG. 1, immediately downstream of the first bonding station 154.

More particularly, in the illustrated embodiment, at the first bonding station 154, two bond lines are formed parallel to the longitudinal axis, a first bond line 162 near a lateral edge of the pad precursor 134, and a second bond line 164 near the middle of the pad precursor 134. Although the bond lines 162 and 164 are shown as solid lines, such is for purposes of illustration only. Various interrupted bond line patterns may be employed, resembling stitching, or even a series of points. It is important that a bonding pattern be selected which is sufficient for structural integrity but which, at the same time, does not result in pads which are unduly stiff.

The next stage in the machine 100 of FIG. 1, downstream with reference to the first bonding station 154, is a handle folding station 166 which folds over the free portion 158 of the handle forming material to uncover a portion 168 of the barrier layer material 108 previously covered by the free portion 158. The FIG. 3 pad precursor 136 and the corresponding view of FIG. 3C represent the condition at point 170 in the machine 100 of FIG. 1, immediately downstream of the handle folding station 166.

At a second bonding station 172 the now uncovered portion 168 of the barrier layer material 108 is fused to the base pad forming material 102, along a bond line 174, which is similar to the first and second bond lines 162 and 164. The result is represented by FIG. 3 pad precursor 138 and the corresponding view of FIG. 3D, which represent the condition of point 176 in the machine 100 of FIG. 1, immediately downstream of the second bonding station 172.

Next, at a die cutting station 178 rotary die cutting tooling for example cuts through all three layers of material, creating and freeing multilayer pads 140 at 180. Although not illustrated, the finished pads 140 are collected and packaged in a conventional manner. As one example, a die cutter and collection mechanism is disclosed in greater detail in the above-referenced Woods et al U.S. Pat. No. 6,493,898.

Finally, a scrap rewind roll 182 collects the remaining scrap web material 184. The scrap web material 184 includes remnants of all three layers, with multiple apertures where pads have been cut out.

Figure 4:
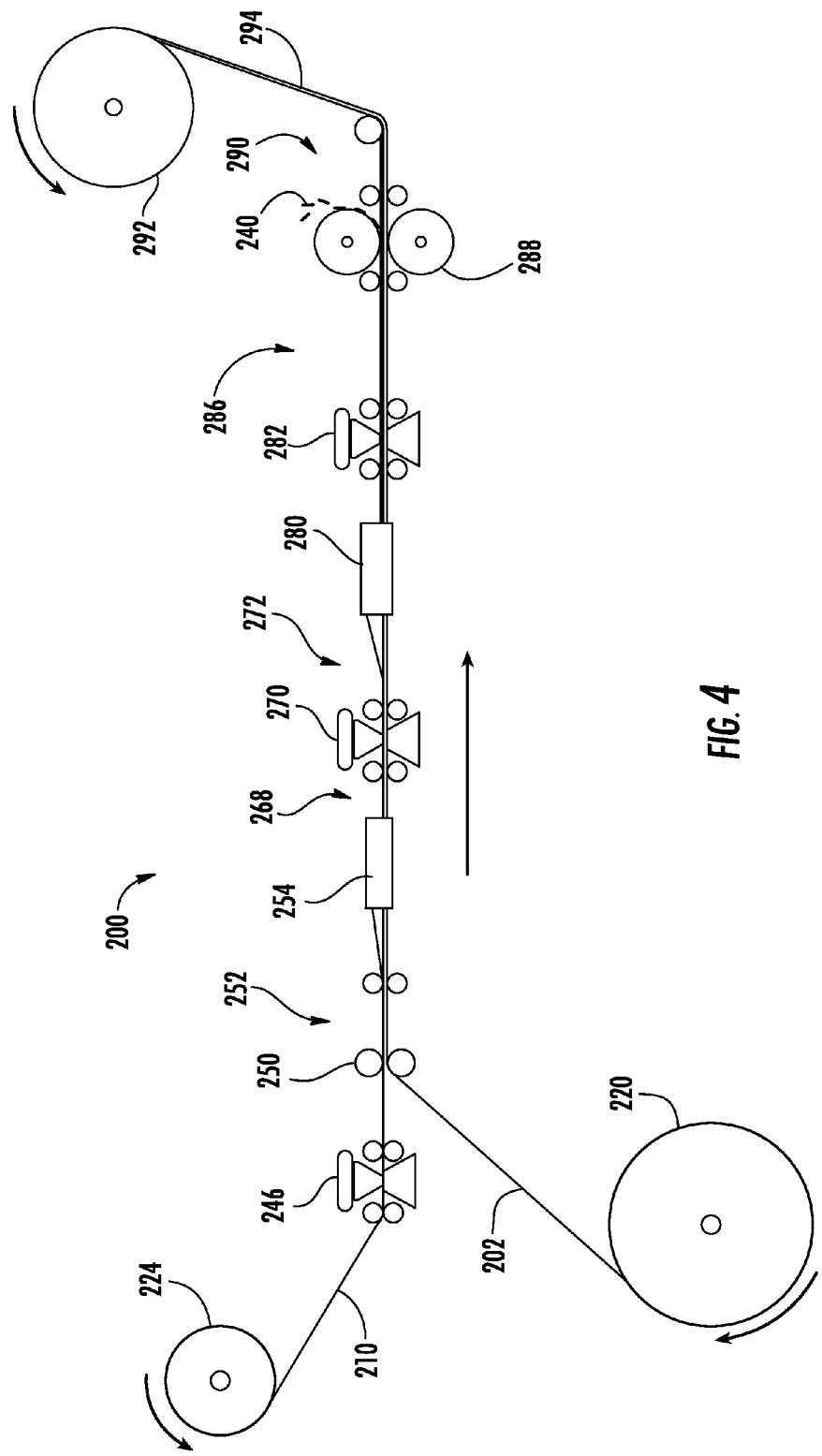
FIG. 4 is a schematic representation of a machine for the in-line automatic manufacture of two-layer pads, which have what may be referred to as "folded" handles, the machine of FIG. 3 including ultrasonic bonding equipment and automatic folding tooling.

Referring next to FIG. 4, a machine 200 for the in-line automatic manufacture of two-layer pads employing ultrasonic embossing, slitting and bonding equipment is illustrated in schematic representation. The machine 200 of FIG. 4 may be employed to make pads having "folded" handles as generally disclosed in Woods et al U.S. Pat. No. 6,493,898. FIG. 5 is a corresponding highly schematic representation of in-line steps to manufacture pads with "folded" handles employing the machine of FIG. 4.

Two webs of fusible material are processed in the machine 200 of FIG. 4, a web 202 of fusible base pad forming material having a longitudinal axis represented by directional arrow 204 (FIG. 5) and a width 206 (FIG. 5), and a web 210 of fusible handle forming material having a longitudinal axis also represented by the directional arrow 204, and having a width 216. In order to provide additional material to form the longitudinally extending pleat of a "folded" handle, the width 216 of the handle forming material web 210 is approximately two times the width 206 of the base pad material web 202. In the embodiment of FIGS. 4 and 5 it is not absolutely necessary that the web 210 of handle forming material be longitudinally slit or split. However, in some embodiments, depending on the configuration of the downstream handle folding tooling, described hereinbelow, it may be advantageous to provide individual sub webs of handle forming material. The embodiment of FIGS. 4 and 5 does not require an intermediate barrier material layer.

The machine 200 includes a feed roll 220 feeding or supplying the web 202 of fusible base pad forming material, and a feed roll 224 supplying the web 210 of fusible handle forming material. To facilitate thermal fusion, the material webs 202 and 210 are of thermoplastic materials, such as polypropylene. The web 202 of base pad forming material is an absorbent material, made of non-woven fibers such as polypropylene or polyester. A blend of fibers for the base pad 202 material may also be employed, for example including cotton (which by itself is non-fusible), but with a sufficient percentage of fusible fibers in the blend so that the resultant base pad material web 202 is fusible.

The machine of FIG. 4 may be employed to manufacture pads in a single line as implied by FIG. 5. However, in practical commercial embodiments pads are manufactured in-line in multiple longitudinal lines defining rows with multiple pad precursors extending across the width of the web 202 as disclosed in U.S. Pat. No. 6,493,898. Accordingly, it will be appreciated that the single line of pads in FIG. 5 is to illustrate the principles of the invention.

In FIG. 5, two webs are represented. The first is the web 210 of handle forming material. The second is a representative combined web 230 after a longitudinally extending pleat of handle forming material has been formed, thus effectively reducing the width of the web of handle forming material, and after the webs 202 and 210 are conveyed into adjacency. The representative combined web 230 is shown in plan view, including both layers, and including pad precursors or precursor regions 234, 236 and 238 representing stages or steps of pad manufacture by the machine 200 of FIG. 4. It will be appreciated that the actual steps or stages represented by the pad precursors 234, 236 and 238 are spaced out along the length of the FIG. 4 machine 200, and are not actually immediately adjacent as perhaps implied by the representation of FIG. 5.

FIG. 5 also shows a finished pad 240 in plan view, which has been cut out from the representative combined web 230. The pad 240 as manufactured has an embossed handle graspable portion 242 which is folded down as manufactured. FIG. 5E is an end elevational view of the pad 240 in its in-use configuration, with the handle graspable portion 242 pivoted up along fold lines 244 and 245.

Considering the manufacturing method disclosed in FIGS. 4 and 5 in greater detail, in FIG. 4, optional embossing tooling 246 embosses the handle forming material 210 providing texture to facilitate grasping the resultant pad handles. Texture embossing 248 is represented by hatching. As shown on the FIG. 5 web segment 210, the embossing 248 is continuous longitudinally along the web 210 of handle forming material, even though the embossing 248 is also represented in FIG. 5 as discontinuous sections corresponding to the pad precursors 234, 236 and 238.

Mechanical embossing tooling may be employed at 246 or, alternatively, ultrasonic embossing tooling may be employed.

Downstream of the embossing tooling 246, the two webs 202 and 210 are conveyed into adjacency, between a pair of rollers 250.

The corresponding view of FIG. 5A represents the condition at point 252 in the machine 200 of FIG. 4. Both layers are present, but no pleating or bonding has occurred, so the handle forming material web 210 is wider than the base pad material web 202. Pads have not yet been cut out, existing as precursor regions only.

At a first handle folding tooling station 254, the handle layer material web 210 is formed into a longitudinally extending pleat 256 including two facing segments 258 and 259 and a folded edge 260, the pleat 256 defining a handle graspable portion precursor. To subsequently provide clearance for ultrasonic bonding tooling, the height of the pleat 256 is less than one-half of the width of the pad 240 being manufactured. In addition, a pair of longitudinally extending handle attached portion precursors 262 and 264 are formed, joined to the pleat 256 along the fold lines 244 and 245. The pleat 256 is folded down to one side generally over the handle attached portion precursor 262, while leaving a portion 266 of the precursor 262 exposed near a lateral edge (since the height of the pleat 256 is less than one-half the width of the pad 240 being manufactured.) The other handle attached portion precursor 264 is fully exposed. The FIG. 5 pad precursor 234 and the corresponding view of FIG. 5B represent the condition at point 268 in the machine 200 of FIG. 4, immediately downstream of the first handle folding tooling station 254.

At a first bonding station 270, the other handle attached portion precursor 264 is fused to the base pad forming material layer 202, at least immediately adjacent the fold line 245, and preferably in additional bonding regions. In addition, the exposed portion 266 of the handle attached portion precursor 262 is fused to the base pad forming material layer 202. The FIG. 5 pad precursor 236 and the corresponding view of FIG. 5C represent the condition at point 272 in the machine of FIG. 4, immediately downstream of the first bonding station 270.

More particularly, in the illustrated embodiment, at the first bonding station 270, three bond lines are formed parallel to the longitudinal axis, a pair of outer bond lines 274 and 276 near lateral edges of the pad precursor 236, and a first inner bond line 278 adjacent the fold line 245. Although the bond lines 274, 276 and 278 are shown as solid lines, such is for purposes of illustration only. Various interrupted bond line patterns may be employed, resembling stitching, or even a series of points. It is important that a bonding pattern be selected which is sufficient for structural integrity but which, at the same time, does not result in pads which are unduly stiff.

The next stage in the machine 200 of FIG. 4, downstream with reference to the first bonding station 270 is a second handle folding tooling station 280 which folds the pleat 256 over to the other side to fully expose the one handle attached portion precursor 262.

Then, at a second bonding station 282, the one handle attached portion precursor 262 is fused to the base pad forming material layer 202 at least immediately adjacent the fold line 244, along a second inner bond line 284, which is similar to the bond lines 274, 276 and 278. The result is represented by FIG. 5 pad precursor 238 and the corresponding view of FIG. 5D, which represent the condition of point 286 in the machine 200 of FIG. 4, immediately downstream of the second bonding station 282.

Next, at a die cutting station 288 rotary die cutting tooling for example cuts through both layers of material, creating and freeing multilayer pads 240 at 290. Although not illustrated, the finished pads 240 are collected and packaged in a conventional manner. As one example, a die cutter and collection mechanism is disclosed in greater detail in the above-referenced Woods et al U.S. Pat. No. 6,493,898.

Finally, a scrap rewind roll 292 collects the remaining scrap web material 294. The scrap web material 294 includes remnants of both layers, with multiple apertures where pads have been cut out.

Figure 6A:
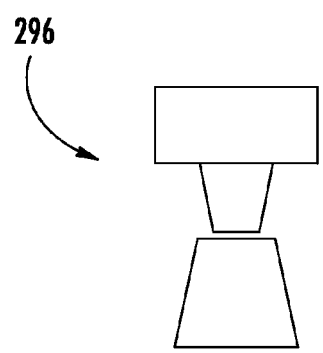
FIG. 6A is a representation of a single ultrasonic horn and anvil, which may be tooled to emboss, weld and slit various materials.

FIG. 6A schematically represents a single ultrasonic horn and anvil set 296 for use when pads are manufactured in a single line. The set 296 may be tooled to emboss, weld and slit materials.

Figure 6B:
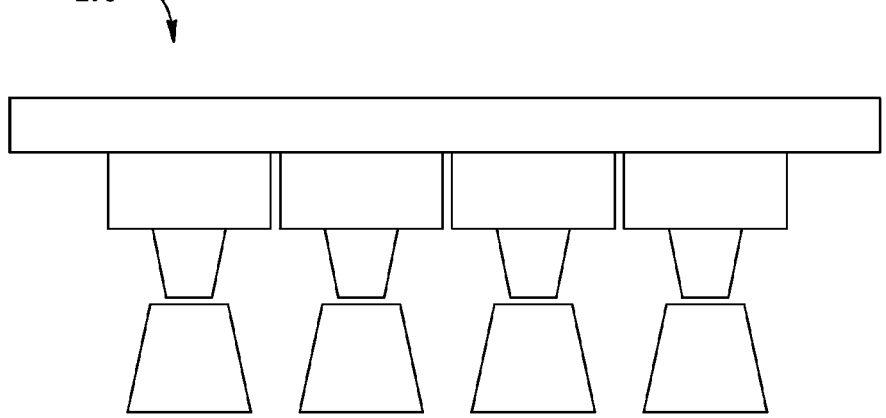
FIG. 6B is a representation of an array of across-the-web ultrasonic horns and anvils, which may be tooled to perform various in-line processes.

FIG. 6B schematically represents an array 298 of across-the-web ultrasonic horns and anvils for use when pads are manufactured in multiple longitudinal lines.

Figure 7:
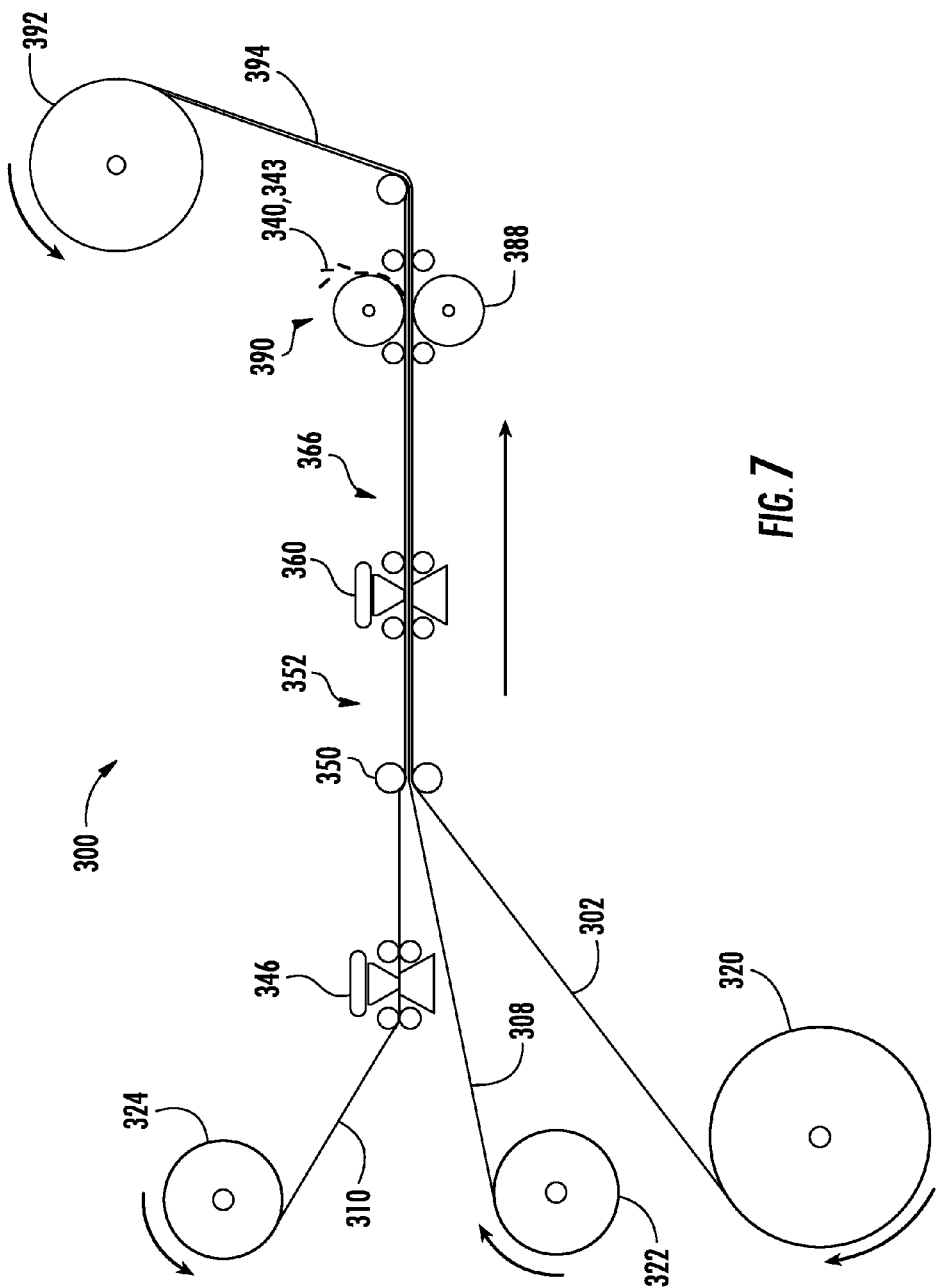
FIG. 7 is a schematic representation of a machine for the in-line automatic manufacture of three-layer pads, which pads either have "L"-shaped handles (as described hereinbelow with reference to FIG. 8), or have handles configured as "wings" (as described hereinbelow with reference to FIG. 10), the machine of FIG. 7 requiring only a single ultrasonic bonding station.
Figure 9A:
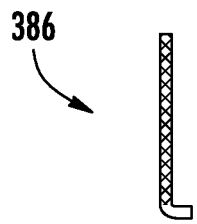
FIG. 9A is an end elevational view of an "L"-shaped handle in isolation similar to handle of the pad of FIGS. 8, 8C and 8D, but with the horizontal leg of the handle being significantly shorter than the upright portion.
Figure 9B:
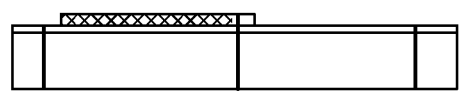
FIG. 9B is an end elevational view of a pad having the "L"-shaped handle of FIG. 9A, the handle being folded down in the configuration of FIG. 9B.
Figure 9C:
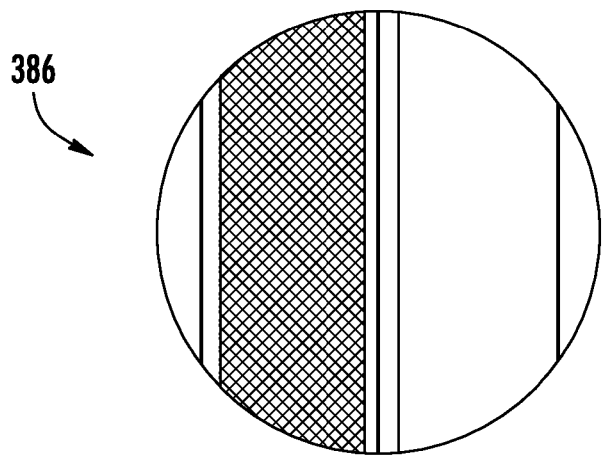
FIG. 9C is a plan view of the pad of FIG. 9C.
Figure 9D:
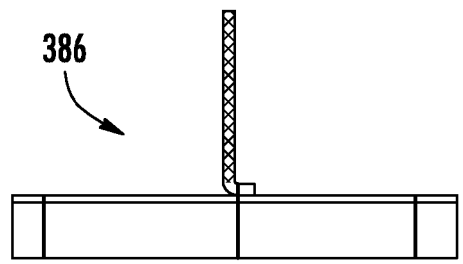
FIG. 9D is an end elevational view of the pad of FIGS. 9B and 9C, in the same orientation as FIG. 9B, but with the handle being folded up in the configuration of FIG. 9D.

Referring next to FIG. 7, a machine 300 for the in-line automatic manufacture of three-layer pads employing ultrasonic embossing, slitting and bonding equipment is illustrated in schematic representation. The machine 300 of FIG. 7 may be employed to make pads having "L"-shaped handles as generally disclosed in Woods et al U.S. Pat. No. 5,230,119 and U.S. Re. 36,601, or handles resembling "wings" as disclosed in Woods et al U.S. Pat. No. 5,771,524. FIG. 8 is a corresponding highly schematic representation of in-line steps to manufacture pads with "L"-shaped handles employing the machine 300 of FIG. 7. FIG. 10 is a corresponding highly schematic representation of in-line steps to manufacture pads with "wing" handles employing the machine 300 of FIG. 7.

Three webs of fusible material are processed in the machine 300 of FIG. 7, a web 302 of fusible base pad forming material having a longitudinal axis represented by directional arrow 304 and a width 306, a web 308 of fusible intermediate barrier layer forming material having a longitudinal axis also represented by the directional arrow 304 and the same width 306, and a web 310 of fusible handle forming material having a longitudinal axis also represented by the directional arrow 304.

For use in the machine 300 of FIG. 7, it is necessary that the web 310 of handle forming material be trimmed in width so that the handle material does not extend all the way across the width of a pad being manufactured. More particularly, for making pads with "L"-shaped handles as in FIG. 8, the web 310 of handle forming material is trimmed on one side, resulting in the FIG. 8 web 312. For making pads with "wing" handles as in FIG. 10, the web 310 of handle forming material is trimmed on both sides, resulting in the FIG. 10 web 314.

The machine 300 includes a feed roll 320 feeding or supplying the web 302 of fusible base pad forming material, a feed roll 322 supplying the web 308 of fusible intermediate barrier layer forming material having a longitudinal axis and a width, and a feed roll 324 supplying the web 310 of fusible handle forming material. To facilitate thermal fusion, the material webs 302, 308 and 310 are of thermoplastic materials, such as polypropylene. The web 302 of base pad forming material is an absorbent material, made of non-woven fibers such as polypropylene or polyester. A blend of fibers for the base pad 302 material may also be employed, for example including cotton (which by itself is non-fusible), but with a sufficient percentage of fusible fibers in the blend so that the resultant base pad material web 302 is fusible.

The machine of FIG. 7 may be employed to manufacture pads in a single line as implied by FIGS. 8 and 10. However, in practical commercial embodiments pads are manufactured in-line in multiple longitudinal lines defining rows with multiple pad precursors extending across the width of the webs 308 and 310. Accordingly, it will be appreciated that the single lines of pads in FIGS. 8 and 10 are to illustrate the principles of the invention.

In FIG. 8, a representative combined web 330 is shown in plan view, including all three layers, and including pad precursors or precursor regions 332 and 334 representing stages or steps of pad manufacture by the machine 300 of FIG. 7. In FIG. 10, a similar representative combined web 335 is shown in plan view, including all three layers, and including pad precursors or precursor regions 336 and 338 representing stages or steps of pad manufacture by the machine 300 of FIG. 7. It will be appreciated that the actual steps or stages represented by the pad precursors 332 and 334 (FIG. 8) and 336 and 338 (FIG. 10) are spaced out along the length of the FIG. 7 machine 300, and are not actually immediately adjacent as perhaps implied by the representations of FIGS. 8 and 10.

FIG. 8 also shows a finished pad 340 with an "L"-shaped handle in plan view, which has been cut out from the representative combined web 330. The pad 340 as manufactured has an embossed handle graspable portion 341 which is folded down as manufactured. FIG. 8C is an end elevational view of the pad 340 in its in-use configuration, with the handle graspable portion 341 pivoted up along a fold line 342.

Similarly, FIG. 10 also shows a finished pad 343 with a "wings" configuration handle in plan view, which has been cut out from the representative combined web 335. The pad 343 as manufactured has a pair of embossed handle graspable portions 344 and 345 which are folded down as manufactured. FIG. 10C is an end elevational view of the pad 343 in its in-use configuration, with the handle graspable portions 344 and 345 pivoted up.

Considering the manufacturing method disclosed in FIGS. 7, 8 and 10 in greater detail, in FIG. 7, embossing and slitting tooling 346 optionally embosses the handle forming material 310 providing texture to facilitate grasping the resultant pad handles, as well as slitting or trimming the initial web 310 of handle forming material to form the narrower web 312 of FIG. 8 or the narrower web 314 of FIG. 10. In FIGS. 8 and 10, texture embossing 348 is represented by hatching. As shown on the FIG. 8 web segment 312 and on the FIG. 10 web segment 314, the embossing 348 is continuous longitudinally along the web 310 of handle forming material, even though the embossing 348 is also represented in FIGS. 8 and 10 as discontinuous sections corresponding to the pad precursors 332, 234 and 336, 338.

Mechanical embossing and slitting tooling may be employed at 346 or, alternatively, ultrasonic embossing and slitting tooling may be employed.

Downstream of the embossing and slitting tooling 346, the three webs 302, 308 and 310 are conveyed into adjacency, between a pair of rollers 350. As described in greater detail below, at least one side edge portion of the intermediate barrier layer material web 308 is exposed near a pad precursor lateral edge, made possible because the handle material web 310 is trimmed in width.

Thus, FIG. 8 pad precursor 332 and the corresponding view of FIG. 8A, represent the condition at point 352 in the machine 300 of FIG. 7 when pads with "L"-shaped handles are being manufactured. All three layers are present, but no bonding has occurred. Pads have not yet been cut out, existing as precursor regions only. Significantly a side edge portion 354 of the barrier layer material web 308 is exposed.

Similarly, FIG. 10 pad precursor 336 and the corresponding view of FIG. 10A, represent the condition at point 352 in the machine 300 of FIG. 7 when pads having "wing" configuration handles are being manufactured. All three layers are present, but no bonding has occurred. Pads have not yet been cut out, existing as precursor regions only. Significantly two opposite side edge portions 356 and 358 of the barrier layer material web 308 is exposed.

An advantageous characteristic of the machine 300 of FIG. 7 is that there is a single bonding station 360. This is made possible by the exposed side edge portions 354 (FIG. 8) or 356 and 358 (FIG. 10), which in turn results from the web 310 of handle forming material being trimmed in width.

Thus, at the bonding station 360 a portion of the handle forming material 310 is fused to the barrier layer forming material 308, leaving at least one other portion of the handle forming material 310 free to define a graspable portion precursor.

More particularly, in the in-line steps of FIG. 8 to make pads having "L"-shaped handles, a portion 362 of the handle forming material 310 is fused to the intermediate barrier layer material 308, leaving a free portion 364 of the handle forming material as a graspable portion precursor. At the same time, the barrier layer material 308 is fused to the base pad material 302. The FIG. 8 pad precursor 334 and the corresponding view of FIG. 8B represent the condition at point 366 in the machine 300 of FIG. 7, immediately downstream of the bonding station 360.

When making pads with "L"-shaped handles as in FIG. 8, at the bonding station 360, three bond lines are formed parallel to the longitudinal axis. A pair of outer bond lines 368 and 370 near lateral edges of the pad precursor 334, and another bond line 372 near the middle of the pad precursor 334. The outer bond line 368 and the middle bond line 372 bond all three layers, including the portion 362 of handle forming material. The outer bond line 370 fuses only the barrier layer 308 and the base pad layer 302. Although the bond lines 368, 370 and 372 are shown as solid lines, such is for purposes of illustration only. Various interrupted bond line patterns may be employed, resembling stitching, or even a series of points. It is important that a bonding pattern be selected which is sufficient for structural integrity but which, at the same time, does not result in pads which are unduly stiff.

In the in-line steps of FIG. 10 to make pads having "wing" handles, a portion 374 of the handle forming material 310 is fused to the intermediate barrier layer material 308, leaving a pair of free portions 376 and 378 of the handle forming material as a graspable portion precursors. At the same time, the barrier layer material 308 is fused to the base pad material 302. The FIG. 10 pad precursor 338 and the corresponding view of FIG. 10B represent the condition at point 366 in the machine 300 of FIG. 7, immediately downstream of the bonding station 360.

When making pads having "wing" handles as in FIG. 10, at the bonding station 360, three bond lines are formed parallel to the longitudinal axis. A pair of outer bond lines 380 and 382 near lateral edges of the pad precursor 338, and another bond line 384 near the middle of the pad precursor 338. The outer bond lines 380 and 382 fuse only the barrier layer 308 and the base pad layer 302. The middle bond line 384 bonds all three layers, including the portion 374 of handle forming material. The resultant "wing" handle may be viewed as having a "V" configuration, with the bonding line 384 in the center of the "V". Although the bond lines 380, 382 and 384 are shown as solid lines, such is for purposes of illustration only. Various interrupted bond line patterns may be employed, resembling stitching, or even a series of points. It is important that a bonding pattern be selected which is sufficient for structural integrity but which, at the same time, does not result in pads which are unduly stiff.

FIGS. 9A, 9B, 9C and 9D illustrate a hybrid form of pad 386 which may be made by the machine 300 of FIG. 7. The handle of pad 368 generally is of "L" configuration, but with the horizontal portion of the handle significantly shorter than the upright portion. Alternatively, the pad 386 may be viewed as a "wing" handle pad where one of the two "wings" is missing. Accordingly, it will be appreciated that the pad 386 of FIGS. 9A, 9B, 9C and 9D is manufactured in essentially the same manner as the pad 343 of FIG. 10.

Next, at a die cutting station 388 rotary die cutting tooling for example cuts through all three layers of material, creating and freeing multilayer pads 340 or 343 at 390. Although not illustrated, the finished pads 340 or 343 are collected and packaged in a conventional manner. As one example, a die cutter and collection mechanism is disclosed in greater detail in the above-referenced Woods et al U.S. Pat. No. 6,493,898.

Finally, a scrap rewind roll 392 collects the remaining scrap web material 394. The scrap web material 394 includes remnants of all three layers, with multiple apertures where pads have been cut out.

Figure 11:
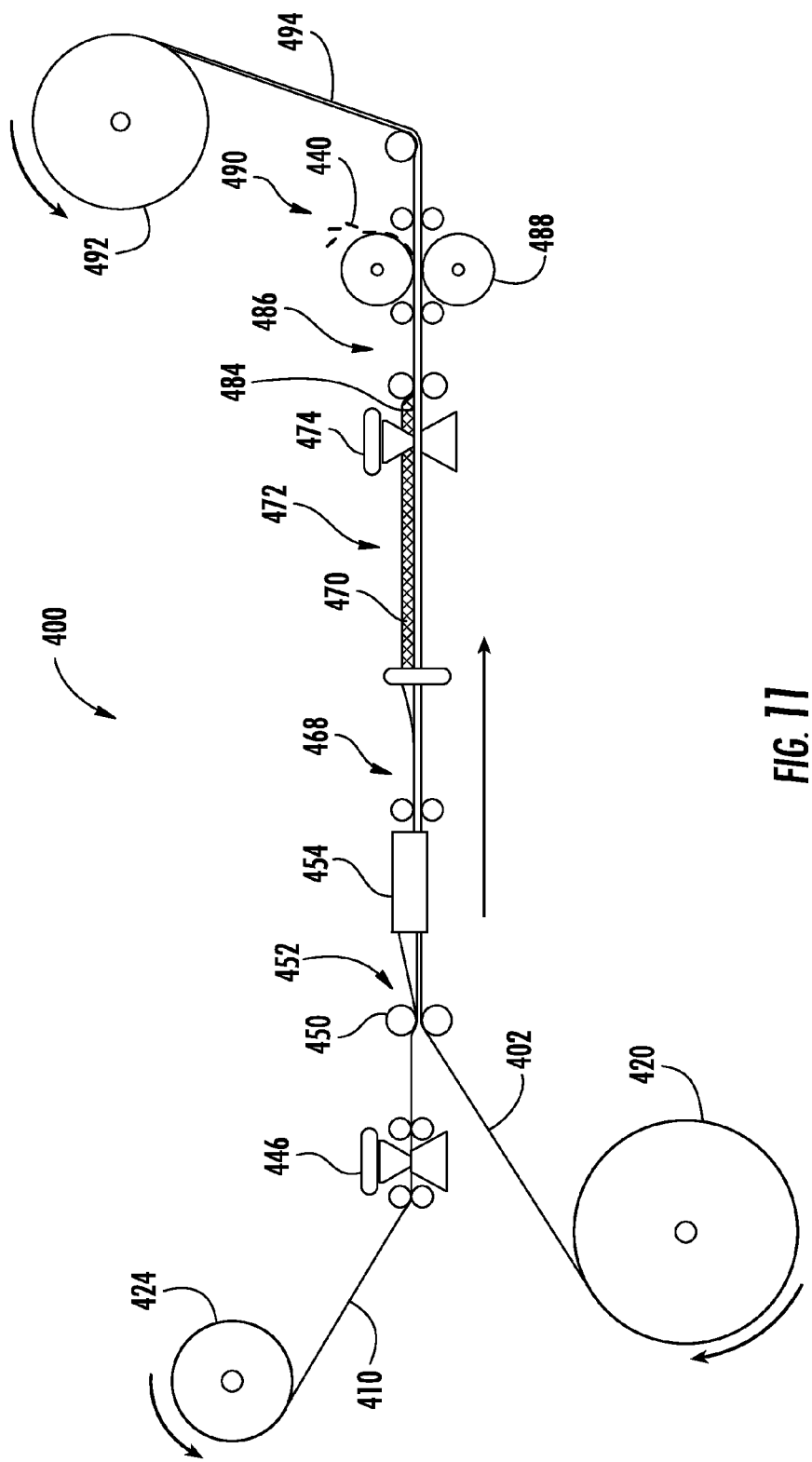
FIG. 11 is a schematic representation of a machine for the in-line automatic manufacture of two-layer pads, which pads have what may be referred to as "folded" handles, similar to the handles of FIGS. 5, 5E and 5F made by the machine of FIG. 4, the machine of FIG. 11, like the machine of FIG. 7, requiring only a single ultrasonic bonding station.

Referring next to FIG. 11, a machine 400 for the in-line automatic manufacture of two-layer pads employing ultrasonic embossing, slitting and bonding equipment is illustrated in schematic representation. The machine 400 of FIG. 11 may be employed to make pads having "folded" handles as generally disclosed in Woods et al U.S. Pat. No. 6,493,898. FIG. 12 is a corresponding highly schematic representation of in line steps to manufacture pads with "folded" handles employing the machine of FIG. 11. Like the machine 300 of FIG. 7, the machine 400 of FIG. 11 includes a single bonding station.

Two webs of fusible material are processed in the machine 400 of FIG. 11, a web 402 of fusible base pad forming material having a longitudinal axis represented by directional arrow 404 (FIG. 12) and a width 406 (FIG. 12), and a web 410 of fusible handle forming material having a longitudinal axis also represented by the directional arrow 404, and having a width 416. In order to provide additional material to form the longitudinally extending pleat of a "folded" handle, the width 416 of the handle forming material web 410 is approximately two times the width 406 of the base pad material web 402. In the embodiment of FIGS. 11 and 12 it is not absolutely necessary that the web 410 of handle forming material be longitudinally slit or split. However, in some embodiments, depending on the configuration of the downstream handle folding tooling, described hereinbelow, it may be advantageous to provide individual sub webs of handle forming material. The embodiment of FIGS. 11 and 12 does not require an intermediate barrier material layer.

The machine 400 includes a feed roll 420 feeding or supplying the web 402 of fusible base pad forming material, and a feed roll 424 supplying the web 410 of fusible handle forming material. To facilitate thermal fusion, the material webs 402 and 410 are of thermoplastic materials, such as polypropylene. The web 402 of base pad forming material is an absorbent material, made of non woven fibers such as polypropylene or polyester. A blend of fibers for the base pad 402 material may also be employed, for example including cotton (which by itself is non fusible), but with a sufficient percentage of fusible fibers in the blend so that the resultant base pad material web 402 is fusible.

The machine of FIG. 11 may be employed to manufacture pads in a single line as implied by FIG. 12. However, in practical commercial embodiments pads are manufactured in line in multiple longitudinal lines defining rows with multiple pad precursors extending across the width of the web 402. Accordingly, it will be appreciated that the single line of pads in FIG. 12 is to illustrate the principles of the invention.

In FIG. 12, two webs are represented. The first is the web 410 of handle forming material. The second is a representative combined web 430 after a longitudinally extending pleat of handle forming material has been formed, thus effectively reducing the width of the web of handle forming material, and after the webs 402 and 410 are conveyed into adjacency. The representative combined web 430 is shown in plan view, including both layers, and including pad precursors or precursor regions 432, 434, 436 and 438 representing stages or steps of pad manufacture by the machine 400 of FIG. 11. It will be appreciated that the actual steps or stages represented by the pad precursors 432, 434, 436 and 438 are spaced out along the length of the FIG. 11 machine 400, and are not actually immediately adjacent as perhaps implied by the representation of FIG. 12.

FIG. 12 also shows a finished pad 440 in plan view, which has been cut out from the representative combined web 430. The pad 440 as manufactured has an embossed handle graspable portion 442 which is folded down as manufactured. FIG. 12F is an end elevational view of the pad 440 in its in use configuration, with the handle graspable portion 442 pivoted up along fold lines 444 and 445.

Considering the manufacturing method disclosed in FIGS. 11 and 12 in greater detail, in FIG. 11, optional embossing tooling 446 embosses the handle forming material 410 providing texture to facilitate grasping the resultant pad handles. Texture embossing 448 is represented by hatching. As shown on the FIG. 12 web segment 410, the embossing 448 is continuous longitudinally along the web 410 of handle forming material, even though the embossing 448 is also represented in FIG. 12 as discontinuous sections corresponding to the pad precursors 432, 434, 436 and 438.

Mechanical embossing tooling may be employed at 446 or, alternatively, ultrasonic embossing tooling may be employed.

Downstream of the embossing tooling 446, the two webs 402 and 410 are conveyed into adjacency, between a pair of rollers 450.

The corresponding view of FIG. 12A represents the condition at point 452 in the machine 400 of FIG. 11. Both layers are present, but no pleating or bonding has occurred, so the handle forming material web 410 is wider than the base pad material web 402. Pads have not yet been cut out, existing as precursor regions only.

At a first handle folding tooling station 454, the handle layer material web 410 is formed into a longitudinally extending pleat 456 including two facing segments 458 and 459 and a folded edge 460, the pleat 456 defining a handle graspable portion precursor. In this particular embodiment, there is no particular requirement regarding the height of the pleat 456. In addition, a pair of longitudinally extending handle attached portion precursors 462 and 464 are formed, joined to the pleat 456 along the fold lines 444 and 445. The pleat 456 is folded down to one side generally over the handle attached portion precursor 462. The FIG. 12 pad precursor 432 and the corresponding view of FIG. 12B represent the condition at point 468 in the machine 400 of FIG. 11, immediately downstream of the first handle folding tooling station 454.

Next, at a second tooling station 470 the pleat 456 is pivoted so as to stand in an upright position perpendicular to the handle attached portion precursors 462 and 464 and perpendicular to the base pad forming material 402. The FIG. 12 pad precursor 434 and the corresponding view of FIG. 12C represent the condition at point 472 in the machine of FIG. 11, immediately downstream of the second tooling station 470.

With the pleat 456 upright, all required bonding points are accessible. A characteristic of the machine 400 of FIG. 11 is that there is a single bonding station 474.

At the bonding station 474, four bond lines are formed parallel to the longitudinal axis, a pair of outer bond lines 476 and 478 near lateral edges of the pad precursor 436, and a pair of inner bond lines 480 and 482 adjacent the fold lines 444 and 445. Although the bond lines 476, 478, 480 and 482 are shown as solid lines, such is for purposes of illustration only. Various interrupted bond line patterns may be employed, resembling stitching, or even a series of points. It is important that a bonding pattern be selected which is sufficient for structural integrity but which, at the same time, does not result in pads which are unduly stiff. The FIG. 12 pad precursor 436 and the corresponding view of FIG. 12D show the condition immediately following bonding.

Immediately downstream with reference to the bonding station 474 is another handle folding tooling station 484 which folds the pleat 456 down, prior to cutting. The result is represented by FIG. 12 pad precursor 438 and the corresponding view of FIG. 12E, which represent the condition of point 486 in the machine 400 of FIG. 11.

Next, at a die cutting station 488 rotary die cutting tooling for example cuts through both layers of material, creating and freeing multilayer pads 440 at 490. Although not illustrated, the finished pads 440 are collected and packaged in a conventional manner.

Finally, a scrap rewind roll 492 collects the remaining scrap web material 494. The scrap web material 494 includes remnants of both layers, with multiple apertures where pads have been cut out.

Figure 13E:
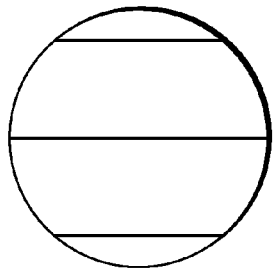
FIGS. 13A, 13B, 13C, 13D and 13E illustrate, for purposes of example, five of the many ultrasonic welding/bonding patterns available.
Figure 13D:
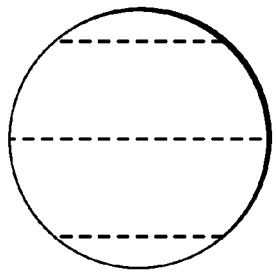
Figure 13C:
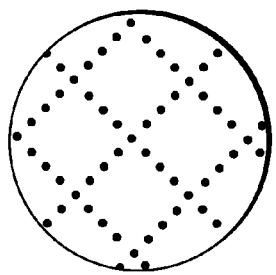
Figure 13B:
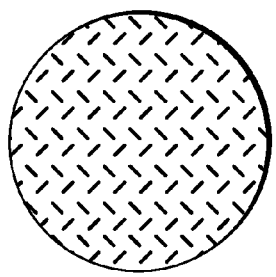
Figure 13A:
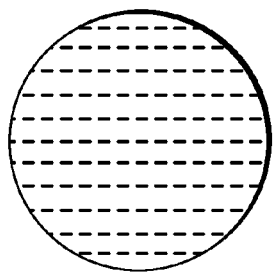

FIGS. 13A, 13B, 13C, 13D and 13E illustrate, for purposes of example, five of the many ultrasonic welding/bonding patterns available. The patterns of FIGS. 13A and 13B are employed in the embodiments specifically disclosed herein. However, the patterns of FIGS. 13C, 13D and 13E may as well be employed, depending upon the particular pad configuration. It is important to select an ultrasonic bonding pattern which provides sufficient structural integrity which, at the same time, does not render the resultant pad unduly stiff.

Figure 14:
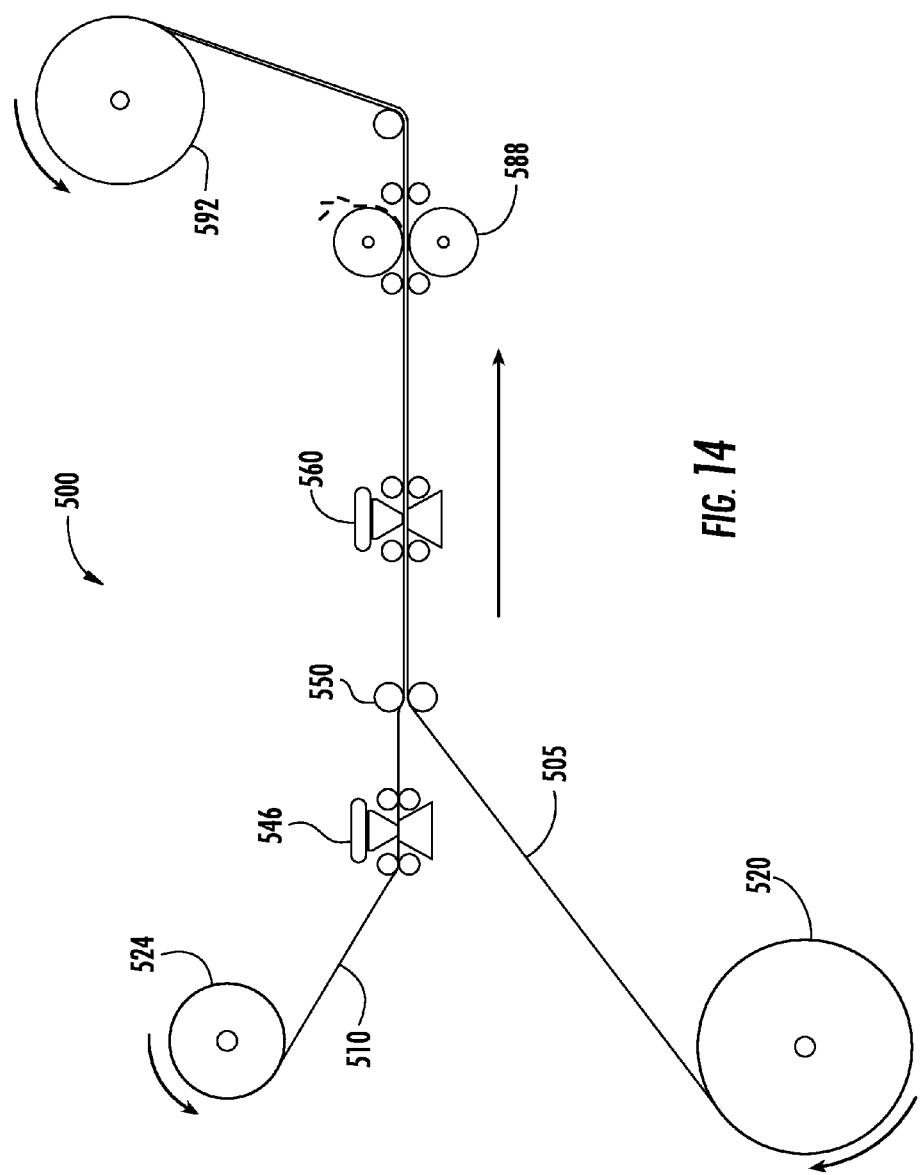
FIG. 14 is a schematic representation of a machine for the in-line automatic manufacture of two-layer pads using a coextruded barrier-to-base layer material ultrasonically bonded to a layer of handle forming material, which pads either have "L"-shaped handles or have handles configured as "wings," the machine of FIG. 14, like the machine of FIG. 7, requiring only a single ultrasonic bonding station.

Finally, FIG. 14 illustrates a machine 500 which, in general, is an alternative to the machine 300 of FIG. 7. The machine 500 of FIG. 14 may be employed to make pads having "L"-shaped handles, or pads having handles resembling "wings."

The primary difference between the machine 500 of FIG. 14 and the machine 300 of FIG. 7 is that rather than separate layers of base pad material 302 and barrier layer material 308, the machine 500 employs a single web 505 of co-extruded barrier to base material. Such a web 505 is formed by hot extrusion of material forming an impervious barrier layer over a layer of base pad forming material to form a single fused web prior to further processing.

Otherwise, the elements and functioning of the FIG. 14 machine 500 are similar.

A web 510 of handle forming material is essentially identical to the web 310 of handle forming material described hereinabove with reference to FIGS. 7, 8 and 10.

Briefly, the machine 500 includes a feed roll 520 feeding or supplying the web 505 of co-extruded barrier to base material, and a feed roll 524 supplying the web 510 of fusible handle forming material.

The machine 500 thus includes embossing and slitting tooling 546, rollers 550, a single bonding station 560, a die cutting station 588 and a scrap rewind roll 592.

In view of the foregoing, it will be appreciated that embodiments of the invention, wherein layers forming multi-layer pads are laminated ultrasonically, without the use of any form of adhesive, provide a number of potential advantages, including:

Environmental. No chemicals such as those contained in solvent, water-based and hot melt adhesives are released into the atmosphere.

Reduced health hazards. The elimination of any residual chemical binders, released during the application of adhesives, that equipment operators may inhale or otherwise come into contact with.

Scrap from like substrate materials, polypropylene film to polypropylene non-woven for example, employed in the manufacture of pads may be recycled without concern for contamination by various adhesives. Scrap generated from similar materials that include adhesives is generally not recyclable.

No adhesive costs, as well as a significant reduction in the total cost of the pads produced.

Adhesives equipment and tooling requires substantial set-up, as well as ongoing and end-of-shift cleaning and adjusting. Substantial time and labor cost savings can be effected by eliminating the ongoing and end-of-shift adhesive tooling clean up.

The elimination of adhesive equipment also means there is no down-time for the start-up, pre-heating and repeated refilling of adhesive reservoirs.

Ultrasonic bonding or welding can reduce or eliminate potential adverse effects of heating the materials used to manufacture the pads. The materials used to manufacture the pads are temperature sensitive. This means that in order to create a bond the hot melt adhesive may reach a temperature such that the substrates can, and sometimes do, become warped.

Hot melt adhesive applicators are highly sensitive to line speed. Thus, the dwell time may increase (decrease in line speed) such that the hot adhesive sits too long at one spot and also causes warping. This can result in down time, clean up costs, materials loss and quality control issues. On the other hand ultrasonic tooling may be stopped and started almost instantaneously, similar to the way a sewing machine can stop and start. With ultrasonic tooling, there is no warping, loss of time, wasted material, nor related quality control issues.

When adhesives are employed to join substrates there is the possibility of undesirable overspray or adhesive misplacement, which can result in surface "tack" and resultant pick up and transfer of particles and soil to the finished product. When such occurs, the production line must be shut down, all of the contaminated substrate and product discarded, and all equipment thoroughly cleaned, all at a significant cost in time and money.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An in-line method for manufacturing a plurality of multilayer pads, comprising the steps of:
providing a web of fusible base pad forming material having a longitudinal axis and a width;
providing a web of fusible intermediate barrier layer forming material having a longitudinal axis and a width;
providing a web of fusible handle forming material having a longitudinal axis;
conveying the webs into adjacency;
at a first bonding station, fusing a portion of the handle forming material to the barrier layer forming material leaving a free portion of the handle forming material, and correspondingly fusing the barrier layer forming material to the base pad forming material;
folding over the free portion of the handle forming material to uncover a portion of the barrier layer forming material previously covered by the free portion;
at a second bonding station, fusing the uncovered portion of the barrier layer forming material to the base pad forming material; and
cutting through the layers of handle forming material, intermediate layer forming material and base pad forming material to create a multilayer pad.

2. An in-line method for manufacturing a plurality of multilayer pads, comprising the steps of:
providing a web of fusible base pad forming material having a longitudinal axis and a width;
providing a web of fusible intermediate barrier layer forming material having a longitudinal axis and a width;
providing a web of fusible handle forming material having a longitudinal axis;
conveying the webs into adjacency;
at a first bonding station, fusing a portion of the handle forming material to the barrier layer forming material leaving a free portion of the handle forming material, and correspondingly fusing the barrier layer forming material to the base pad forming material, at the first bonding station two bond lines being formed parallel to the longitudinal axis, a first bond line near a lateral edge of a pad precursor, and a second bond line near the middle of the pad precursor;
folding over the free portion of the handle forming material to uncover a portion of the barrier layer forming material previously covered by the free portion;
at a second bonding station, fusing the uncovered portion of the barrier layer forming material to the base pad forming material, at the second bonding station a third bond line being formed near the opposite lateral edge of the pad precursor, and
cutting through the layers of handle forming material, intermediate layer forming material and base pad forming material to create a multilayer pad.

3. An in-line method for manufacturing a plurality of multilayer pads, comprising the steps of:
providing a web of fusible base pad forming material having a longitudinal axis and a width;
providing a web of fusible intermediate barrier layer forming material having a longitudinal axis and a width;
a plurality of pad precursors extending across the widths of the webs of base pad forming material and barrier layer forming material;
providing a web of fusible handle forming material having a longitudinal axis and a corresponding plurality of narrower sub webs of handle forming material;
providing a web of fusible handle forming material having a longitudinal axis;
conveying the webs into adjacency;
at a first bonding station, fusing a portion of the handle forming material to the barrier layer forming material leaving a free portion of the handle forming material, and correspondingly fusing the barrier layer forming material to the base pad forming material;

folding over the free portion of the handle forming material to uncover a portion of the barrier layer forming material previously covered by the free portion;

at a second bonding station, fusing the uncovered portion of the barrier layer forming material to the base pad forming material; and cutting through the layers of handle forming material, intermediate layer forming material and base pad forming material to create a multilayer pad.

4. The method of claim 3, which further comprises employing a slitter to slit an initial web of handle forming material into the plurality of narrower sub webs of handle forming material.

5. An in-line method for manufacturing a plurality of multilayer pads, comprising the steps of:

providing a web of fusible base pad forming material having a longitudinal axis and a width;

providing a web of fusible handle forming material having a longitudinal axis;

conveying the webs into adjacency and forming the web of handle forming material into a longitudinally extending pleat including two facing segments of handle forming material and a folded edge defining a handle graspable portion precursor, the height of the pleat being less than one-half of the width of a pad being manufactured, and into a pair of longitudinally extending handle attached portion precursors joined to the pleat along fold lines and extending over the base pad forming material;

folding the pleat down to one side generally over one of the handle attached portion precursors while leaving a portion of the one handle attached portion precursor exposed near a pad precursor lateral edge, with the other handle attached portion precursor fully exposed;

at a first bonding station, fusing the other handle attached portion precursor to the base pad forming material at least immediately adjacent one of the fold lines, and fusing the exposed portion of the one handle attached portion to the base pad forming material;

folding the pleat over to the other side to fully expose the one handle attached portion precursor;

at a second bonding station, fusing the one handle portion precursor to the base pad forming material at least immediately adjacent to the other of the fold lines; and cutting through the layers of handle forming material and base pad forming material to create a multilayer pad.

6. The method of claim 5, wherein at the first bonding station three bond lines are formed parallel to the longitudinal axis, a pair of outside bond lines near pad precursor opposed lateral edges, and a bond line immediately adjacent the one of the fold lines.

7. The method of claim 6, wherein at the second bonding station a bond line is formed parallel to the longitudinal axis immediately adjacent the other of the fold lines.

8. An in-line method for manufacturing a plurality of multilayer pads, comprising the steps of:

providing either a web of fusible base pad forming material and a web of fusible intermediate barrier layer forming material having longitudinal axes and widths, or a single web of fusible co-extruded barrier-to-base layer material having a longitudinal axis and a width;

providing a web of fusible handle forming material having a width less than the width of a pad being manufactured;

conveying the webs into adjacency, with at least one side edge portion of the intermediate barrier layer or of the co-extruded material layer exposed near a pad precursor lateral edge;

at a bonding station, fusing a portion of the handle forming material to the intermediate barrier layer or to the co-extruded material layer while leaving at least one other portion of the handle forming material free to define a graspable portion precursor, and, in the event separate webs of base pad forming material and intermediate barrier layer forming material were provided, fusing the barrier layer forming material to the base pad forming material; and cutting through the layers of material to create a multilayer pad.

9. The method of claim 8, wherein said step of fusing comprises fusing a lateral side portion of the handle forming material to the intermediate barrier layer or to the co-extruded material layer, leaving a single free graspable portion precursor, whereby pads with "L"-shaped handles are manufactured.

10. The method of claim 8, wherein said step of fusing comprises fusing a laterally centered portion of the handle forming material to the intermediate barrier layer or to the co-extruded material layer, leaving a pair of free graspable portion precursors, whereby pads with handles of "wing" configuration are manufactured.

11. An in-line method for manufacturing a plurality of multilayer pads, comprising the steps of:

providing a web of fusible base pad forming material having a longitudinal axis and a width;

providing a web of fusible handle forming material having a longitudinal axis;

conveying the webs into adjacency and forming the web of handle forming material into a longitudinally extending pleat including two facing segments of handle forming material and a folded edge defining a handle graspable portion precursor, the height of the pleat being less than one half of the width of a pad being manufactured, and into a pair of longitudinally extending handle attached portion precursors joined to the pleat along fold lines and extending over the base pad forming material;

standing the pleat upright perpendicularly to the handle attached portion precursors and to the base pad forming material prior to a bonding station;

at the bonding station, and with the pleat upright, fusing the handle attached portion precursors to the base pad forming material at least immediately adjacent the fold lines, the pleat remaining upright for the duration of the fusing; and cutting through the layers of handle forming material and base pad forming material to create a multilayer pad.

12. An in-line method for manufacturing a plurality of multilayer pads, comprising the steps of:

providing a web of fusible base pad forming material having a longitudinal axis and a width;

providing a web of fusible handle forming material having a longitudinal axis;

conveying the webs into adjacency and forming the web of handle forming material into a longitudinally extending pleat including two facing segments of handle forming material and a folded edge defining a handle graspable portion precursor, the height of the pleat being less than one half of the width of a pad being manufactured, and into a pair of longitudinally extending handle attached portion precursors joined to the pleat along fold lines and extending over the base pad forming material;

standing the pleat upright perpendicularly to the handle attached portion precursors and to the base pad forming material;

at a bonding station, fusing the handle attached portion precursors to the base pad forming material at least immediately adjacent the fold lines, at the bonding station a pair of outside bond lines being formed parallel to the longitudinal axis near pad precursor opposed lateral edges, and a pair of inside bond lines being formed parallel to the longitudinal axis immediately adjacent respective fold lines; and cutting through the layers of handle forming material and base pad forming material to create a multilayer pad.

\* \* \* \* \*